(12) United States Patent
Rydbeck et al.

(10) Patent No.: US 6,216,107 B1
(45) Date of Patent: Apr. 10, 2001

(54) HIGH-PERFORMANCE HALF-RATE ENCODING APPARATUS AND METHOD FOR A TDM SYSTEM

(75) Inventors: Nils Rydbeck, Cary; R. David Koilpillai; Ali S. Khayrallah, both of Apex; Tracy Fulghum, Garner, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/174,207

(22) Filed: Oct. 16, 1998

(51) Int. Cl.[7] .................................................. G10L 19/00
(52) U.S. Cl. ............................................. 704/500; 704/201
(58) Field of Search .................................... 704/221, 211, 704/500–504, 227, 228; 375/246, 250, 253, 327, 328, 330, 333; 370/321, 324, 347, 442

(56) References Cited

U.S. PATENT DOCUMENTS

| | | | |
|---|---|---|---|
| 4,287,577 | * | 9/1981 | Deal, Jr. ................................ 365/233 |
| 5,327,576 | * | 7/1994 | Uddenfeldt et al. ................. 370/333 |
| 5,402,447 | * | 3/1995 | Roney, IV ............................ 375/340 |
| 5,432,778 | * | 7/1995 | Minde et al. ......................... 370/347 |
| 5,535,239 | * | 7/1996 | Padovani et al. .................... 370/209 |
| 5,557,639 | * | 9/1996 | Heikkila et al. ..................... 375/224 |
| 5,610,940 | * | 3/1997 | Durrant et al. ...................... 375/208 |
| 5,689,511 | | 11/1997 | Shimazaki et al. . |
| 5,768,314 | * | 6/1998 | Kapadia et al. ..................... 375/242 |

FOREIGN PATENT DOCUMENTS 34 26 568   1/1986   (DE) .

OTHER PUBLICATIONS

Article entitled: "A Cell Range Extension Technique For GSM/DCS 1800—Using Half–rate Channel" by Z. Honkasaloet al., IEEE International Conference on Universal Personal ?Communications 1995.

Article entitled: Effective Channel Coding Combined With Low Bit–rate Speech Coding For Digital Cellular System: by M. Ikekawa et al., published and proceedings of The Vehicular Technology Conference 1994.

* cited by examiner

Primary Examiner—David Hudspeth
Assistant Examiner—Abul K. Azad
(74) Attorney, Agent, or Firm—Wood, Phillips, VanSanten, Clark & Mortimer

(57) ABSTRACT

In a transmitter for transmitting communication signals across a radio channel, an improved encoder includes a half-rate encoder receiving a digitized speech signal and generating a compressed bit stream at half-rate, and a signal expander receiving the compressed bit stream and generating an expanded bit stream at full-rate for transmission across a radio channel. An improved receiver, receives the transmitted communication signal which is selected from the group consisting of (a) a conventional full-rate encoded digitized speech signal, and (b) a half-rate encoded digitized speech signal including the expanded bit stream. The improved receiver includes a full-rate equalizer, a half-rate equalizer, and a switch initially routing the received digitized speech signal to the full-rate equalizer, wherein the full-rate equalizer demodulates the received digitized speech signal producing a full-rate demodulated signal and dibits of soft information corresponding to the full-rate demodulated signal. An analyzer analyzes the dibits of soft information and controls the switch to route the received digitized speech signal to one of the full-rate and half-rate equalizers based upon the analysis.

15 Claims, 15 Drawing Sheets

(ASSUMES GOOD CHANNEL PERFORMANCE, I.E., LOW BER)

HIGH-PERFORMANCE HALF-RATE ENCODING APPARATUS AND METHOD FOR A TDM SYSTEM

FIELD OF THE INVENTION

The present invention is directed toward an enhanced half-rate encoding and receiving apparatus and method and, more particularly, toward a half-rate encoding and receiving apparatus and method for transmitting and receiving half-rate encoded speech at a rate normally associated with full-rate encoding.

BACKGROUND OF THE INVENTION

In typical U.S. digital cellular telephone systems, analog voice signals are sampled and converted to a digital bit stream. In order to save bandwidth and therefore provide economic advantage, the digital bit stream is compressed by a source encoder before transmission across a radio channel. Generally, cellular systems provide for either full-rate or half-rate encoding of voice signals.

Full-rate source encoding in a typical GSM (Global System for Mobile Communications) system utilizes an LPC (Linear Prediction Coding) encoder with long-term prediction and regular pulse excitation. The output of the LPC encoder is generally 260 bits every 20 milliseconds, to give an encoding rate of 13 kbits/s. The 13 kbits/s signal output by the LPC encoder is input to a signal expander, for example, a channel encoder, which adds redundancy to the bit stream and thereby increases its rate to 22.8 kbits/s. The purpose of the redundancy is to minimize the consequence of bit errors that are often induced by a noisy radio channel.

Half-rate GSM source encoding utilizes a VSELP (Vector Sum Excited Linear Prediction) encoder whose output is generally 112 bits every 20 milliseconds, to give an encoding rate of 5.6 kbits/s. The 5.6 kbits/s signal output by the VSELP encoder is expanded by a channel encoder, which adds redundancy to the bit stream and outputs 228 bits every 20 milliseconds, thus increasing the bit rate from 5.6 kbits/s to 11.4 kbits/s. Again, the purpose of the added redundancy is to minimize transmission errors.

Half-rate encoding effectively doubles the capacity of a cellular system. Accordingly, established cellular standards provide half-rate capability as an economic benefit (twice as many revenue generating users). However, there is some penalty to be paid in return, namely, lower bit rate source encoding, e.g., half-rate encoding, goes hand-in-hand with reduced audio fidelity.

The above comparison between full-rate source encoding and half-rate source encoding assumes that the RF (Radio Frequency) channel carrying the encoded signals does not introduce transmission errors beyond the correction capability of the receiver receiving such signals. In general, this is a good assumption because cellular systems are typically designed to provide a relatively high SNR (Signal-to-Noise Ratio), and therefore a relatively low BER (Bit-Error-Rate). However, under conditions of low SNR, a low-bit-rate encoded signal, whether half-rate or full-rate, can suffer severely degraded audio quality.

This breakdown in performance is important in practice, as commercial applications are being developed where a radio system, conforming to an established cellular-radio air-interface standard, fails to provide the relatively high SNR on which the half-rate/full-rate trade is premised, or which fails to provide adequate SNR for the effective operation of either full or half-rate encoding. Such commercial applications include, but are not limited to, satellite communication systems with a cellular-standard air-interface which inherently has low link margins, as well as extended-range cellular systems that provide marine telephone service or telephone service capable of penetrating an office building, or the like. Moreover, cellular systems often experience episodes of significantly reduced SNR caused by channel fading and shadowing, which may result in degraded audio quality.

The present invention is directed toward overcoming one or more of the above-mentioned problems.

SUMMARY OF THE INVENTION

In a transmitter for transmitting communication signals across a radio channel, an improved encoder is provided including a half-rate encoder receiving a digitized speech signal and generating a compressed bit stream at half-rate, and a signal expander receiving the compressed bit stream and generating an expanded bit stream at full-rate for transmission across a radio channel.

In one form of the improved encoder, the full-rate is approximately 2× the half-rate.

In another form of the improved encoder, the signal expander includes a repeater repeating each bit in the compressed bit stream to generate the expanded bit stream.

In another form of the improved encoder, the signal expander includes a repeater repeating the compressed bit stream to generate the expanded bit stream.

In another form of the improved encoder, the compressed bit stream includes bits classified as one of critical, important and unimportant. The signal expander includes a plurality of encoders additionally encoding the compressed bit stream according to bit classification to generate the expanded bit stream.

An improved receiver, according to a first embodiment, is provided for receiving a digitized speech signal transmitted at a full-rate across a radio channel in a wireless communication system, the digitized speech signal selected from the group consisting of (a) a full-rate encoded digitized speech signal including a stream of binary bits, and (b) a half-rate encoded digitized speech signal including a stream of binary bits expanded for transmission at the full-rate by repeating each bit in the binary bit stream, the improved receiver including a full-rate equalizer, a half-rate equalizer, a switch initially routing the received digitized speech signal to the full-rate equalizer, wherein the full-rate equalizer demodulates the received digitized speech signal producing a full-rate demodulated signal and dibits of information corresponding to the full-rate demodulated signal, and an analyzer analyzing the dibits of information, the analyzer controlling the switch to route the received digitized speech signal to one of the full-rate and half-rate equalizers based upon said analysis.

In one form of the improved receiver, the analyzer includes an XNOR gate receiving the dibits of information, the XNOR gate outputting a logical one if the bits of the dibit are the same and a logical zero if the bits of the dibit are different, a counter receiving the output of the XNOR gate, the counter counting the occurrences of logical ones at the output of the XNOR gate, and a threshold detector connected to the counter, the threshold detector controlling the switch to route the received digitized speech signal to the half-rate equalizer if the number of logical ones counted by the counter exceeds a threshold value.

In another form of the improved receiver, the dibits of information include dibits of soft information, each soft dibit including soft values. The analyzer includes a multiplier multiplying the soft values of the soft dibits together, the multiplier outputting a positive value if the soft values of the soft dibit are of like polarity and negative value if the soft values of the soft dibit are of different polarity, a summer receiving and summing the output of the multiplier, and a threshold detector connected to the summer, the threshold detector controlling the switch to route the received digitized speech signal to the half-rate equalizer if the summed value exceeds a positive threshold value.

In another form of the improved receiver, the dibits of information include dibits of soft information plottable on a differential constellation having real and imaginary axes, each plotted soft dibit representing a complex value of a differential symbol. The analyzer includes a rotator rotating the differential symbols by $\pi/4$, the rotated differential symbols having components on the real and imaginary axes, a summer summing magnitudes of the rotated differential symbol components on the real and imaginary axes and calculating a ratio of real axis summed magnitudes versus imaginary axis summed magnitudes, and a threshold detector connected to the summer, the threshold detector controlling the switch to route the received digitized speech signal to the half-rate equalizer if the calculated ratio exceeds a threshold value.

In another form of the improved receiver, the analyzer includes a rotator rotating the differential symbols by $\pi/4$, the rotated differential symbols having components on the real and imaginary axes, a squarer and summer squaring the complex values of the rotated differential symbols and summing the squared values, and a threshold detector connected to the squarer and summer, the threshold detector controlling the switch to route the received digitized speech signal to the half-rate equalizer if the real component of the squared/summed value exceeds a threshold value.

In another form of the improved receiver, the dibits of soft information include a real number magnitude and a real number phase plottable on a differential constellation, each plotted dibit representing a differential symbol. The analyzer includes a phase differentiator determining phase changes between successive differential symbols, a summer summing the phase changes determined by the phase differentiator, and a threshold detector connected to the summer, the threshold detector controlling the switch to route the received digitized speech signal to the half-rate equalizer if the summed phase changes exceed a threshold value.

An improved receiver, according to a second embodiment, is provided for receiving a digitized speech signal transmitted at a full-rate across a radio channel in a wireless communication system, the digitized speech signal selected from the group consisting of (a) a full-rate encoded digitized speech signal including a stream of binary bits, and (b) a half-rate encoded digitized speech signal including a stream of binary bits expanded for transmission at the full-rate, the improved receiver including a full-rate demodulation branch including a full-rate equalizer and a first CRC (Cyclic Redundancy Check) decoder, a half-rate demodulation branch including a half-rate equalizer and a second CRC decoder, a switch receiving the digitized speech signal and initially routing the received digitized speech signal to both the full-rate and half-rate demodulation branches, wherein the received digitized speech signal is received by the full-rate and half-rate equalizers producing full-rate demodulated and half-rate demodulated signals, respectively. The full-rate demodulated signal input to the first CRC decoder performing a CRC check on the full-rate demodulated signal and producing a first CRC check signal. The half-rate demodulated signal input to the second CRC decoder performing a CRC check on the half-rate demodulated signal and producing a second CRC check signal. The analyzer analyzes the first and second CRC check signals, and controls the switch to route the received digitized speech signal to one of the first and second demodulation branches based on the analysis.

A method of transmitting a digitized signal across a radio channel is provided including steps of encoding a digitized signal at a first rate, expanding the encoded digitized signal to a second rate greater than the first rate, and transmitting the expanded digitized signal at the second rate across a radio channel.

In one form of the transmitting method, the encoded digitized signal includes a binary bit stream, and the step of expanding the encoded digitized signal to a second rate greater than the first rate includes the step of repeating each bit in the binary bit stream.

In another form of the transmitting method, the encoded digitized signal includes a binary bit stream, and the step of expanding the encoded digitized signal to a second rate greater than the first rate includes the step of repeating the binary bit stream.

In another form of the transmitting method, the encoded digitized signal includes a binary bit stream having bits classified as one of critical, important and unimportant, and the step of expanding the encoded digitized signal to a second rate greater than the first rate includes the step of additionally encoding the binary bit stream according to bit classification.

In another form of the transmitting method, the step of additionally encoding the binary bit stream according to bit classification includes the steps of deriving parity bits from the critical bits, encoding the parity bits to produce a first output signal, combining the critical and important bits and adding six tail bits to produce a second output signal, encoding the second output signal to produce a third output signal, encoding the unimportant bits to produce a fourth output signal, and combining the first, third and fourth output signals to produce the expanded digitized signal at the second rate.

In another form of the transmitting method, the step of encoding the parity bits to produce a first output signal includes the step of encoding the parity bits with a ⅙ rate convolutional encoder, the step of encoding the second output signal to produce a third output signal includes the step of encoding the second output signal with a ¼ rate convolutional encoder, and the step of encoding the unimportant bits to produce a fourth output signal includes the step of encoding the unimportant bits with a ½ rate convolutional encoder.

In another form of the transmitting method, the digitized signal includes a TDM (Time Division Multiplex) signal.

In another form of the transmitting method, the second rate is approximately 2× the first rate.

A method of receiving a digitized speech signal transmitted at a full-rate across a radio channel in a wireless communication system is provided, the digitized speech signal selected from the group consisting of (a) a full-rate encoded digitized speech signal including a stream of binary bits, and (b) a half-rate encoded digitized speech signal including a stream of binary bits expanded for transmission at the full-rate by repeating each bit in the binary bit stream, the method including the steps of receiving the digitized speech signal at a receiver, determining whether the received digitized speech signal is the full-rate or half-rate encoded digitized speech signal, and activating either a full-rate or a half-rate equalizer at the receiver in response to the determination to demodulate the received digitized speech signal.

In one form of the receiving method, the steps of determining whether the received digitized speech signal is the full-rate or half-rate encoded digitized speech signal and activating either a full-rate equalizer or a half-rate equalizer at the receiver in response to the determination to demodulate the received digitized speech signal include the steps of demodulating the received digitized speech signal at the full-rate equalizer, the full-rate equalizer producing dibits of information in response thereto, inputting the dibits of information to an XNOR gate, the XNOR gate outputting a logical one if the bits of the dibit are the same and a logical zero if the bits of the dibit are different, counting the number of occurrences of logical ones at the output of the XNOR gate, and activating the half-rate equalizer to demodulate the received digitized speech signal if the number of logical ones exceeds a threshold value.

In another form of the receiving method, the steps of determining whether the received digitized speech signal is the full-rate or half-rate encoded digitized speech signal and activating either a full-rate equalizer or a half-rate equalizer at the receiver in response to the determination to demodulate the received digitized speech signal include the steps of demodulating the received digitized speech signal at the full-rate equalizer, the full-rate equalizer producing dibits of soft information in response thereto, each soft dibit including soft values, multiplying the soft values of the soft dibit together at a multiplier, the multiplier outputting a positive value if the soft values of the soft dibit are the same and a negative value if the soft values of the soft dibit are different, summing the output of the multiplier, and activating the half-rate equalizer to demodulate the received digitized speech signal if the summed output of the multiplier exceeds a threshold value.

In another form of the receiving method, the steps of determining whether the received digitized speech signal is the full-rate or half-rate encoded digitized speech signal and activating either a full-rate equalizer or a half-rate equalizer at the receiver in response to the determination to demodulate the received digitized speech signal include the steps of demodulating the received digitized speech signal at the full-rate equalizer, the full-rate equalizer producing dibits of soft information in response thereto, the soft dibits plottable on a differential constellation having real and imaginary axes, each plotted soft dibit representing a complex value of a differential symbol, rotating the differential symbols by $\pi/4$, the rotated differential symbols having components on the real and imaginary axes, summing magnitudes of the rotated differential symbol components on the real and imaginary axes, calculating a ratio of real axis summed magnitudes versus imaginary axis summed magnitudes, and activating the half-rate equalizer to demodulate the received digitized speech signal if the ratio exceeds a threshold value.

In another form of the receiving method, the steps of determining whether the received digitized speech signal is the full-rate or half-rate encoded digitized speech signal and activating either a full-rate equalizer or a half-rate equalizer at the receiver in response to the determination to demodulate the received digitized speech signal include the steps of demodulating the received digitized speech signal at the full-rate equalizer, the full-rate equalizer producing dibits of soft information in response thereto, the soft dibits plottable on a differential constellation having real and imaginary axes, each plotted soft dibit representing a complex value of a differential symbol, rotating the differential symbols by $\pi/4$, the rotated differential symbols having components on the real and imaginary axes, squaring the complex values of the rotated differential symbols, summing the squared values, and activating the half-rate equalizer to demodulate the received digitized speech signal if the real component of the squared/summed value exceeds a threshold value.

In another form of the receiving method, the steps of determining whether the received digitized speech signal is the full-rate or half-rate encoded digitized speech signal and activating either a full-rate equalizer or a half-rate equalizer at the receiver in response to the determination to demodulate the received digitized speech signal include the steps of demodulating the received digitized speech signal at the full-rate equalizer, the full-rate equalizer producing dibits of soft information in response thereto, each soft dibit representing a differential symbol, determining phase differences between successive differential symbols, summing the determined phase differences, and activating the half-rate equalizer to demodulate the received digitized speech signal if the summed phase difference exceeds a threshold value.

In another form of the receiving method, the steps of determining whether the received digitized speech signal is the full-rate or half-rate encoded digitized speech signal and activating either a full-rate equalizer or a half-rate equalizer at the receiver in response to the determination to demodulate the received digitized speech signal include the steps of demodulating the received digitized speech signal in parallel using both full-rate and half-rate demodulation branches, performing CRC (Cyclic Redundancy Check) checks on the demodulated full-rate and half-rate signals, and deactivating one of the full-rate and half-rate demodulation branches in response to the CRC checks.

A method of establishing voice communication across a radio channel in a wireless communication system is provided, the method including the steps of transmitting a digitized speech signal at a full-rate across a radio channel, the digitized speech signal selected from the group consisting of (a) a full-rate encoded digitized speech signal including a stream of binary bits, and (b) a half-rate encoded digitized speech signal including a stream of binary bits expanded for transmission at the full-rate by repeating each bit in the binary bit stream, receiving the transmitted digitized speech signal at a receiver, determining whether the received digitized speech signal is the full-rate or half-rate encoded digitized speech signal, and activating either a full-rate equalizer or a half-rate equalizer at the receiver in response to the determination to demodulate the received digitized speech signal.

It is an object of the present invention to improve wireless communication performance in low SNR conditions.

It is a further object of the invention to provide increased end-to-end performance across radiotelephone links that exhibit sub-par SNR, without requiring extensive and costly changes to the system's basic structure.

It is a further object of the invention to expand the speech output of a half-rate source encoder to approximately twice the bit rate normally associated with half-rate transmission, so that enhanced half-rate speech is transmitted at the rate normally associated with full-rate transmission.

Other aspects, objects and advantages of the invention can be obtained from a study of the application, the drawings, and the appended claims.

DETAILED DESCRIPTION OF THE PREFERRED EMBODIMENTS

Figure 1:
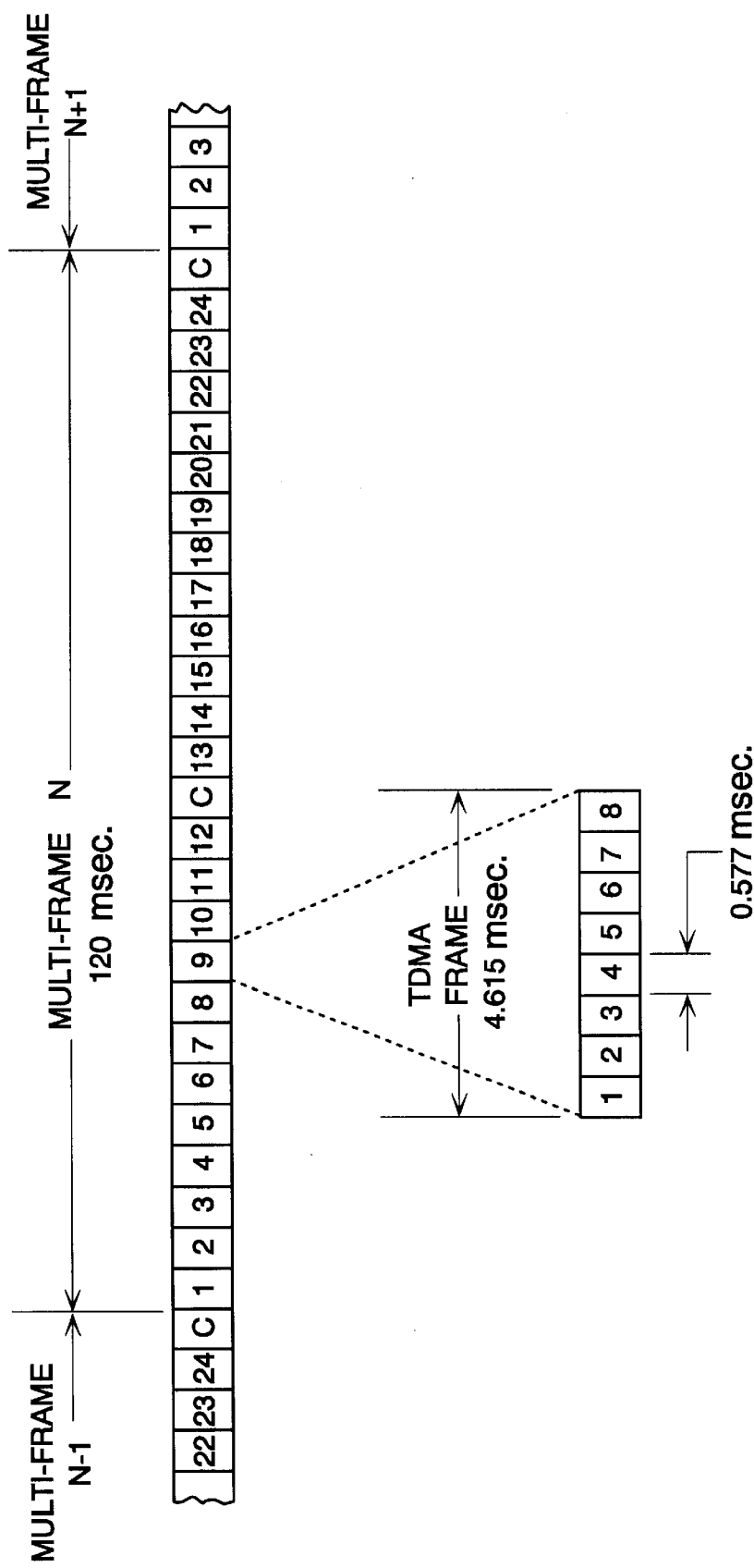
FIG. 1 illustrates a prior art GSM time-division multiframe pattern.

FIG. 1 illustrates how the GSM time-division framing pattern in a TDM system accommodates the bit stream of a source, or channel, encoder. The RF channel is divided into multiple frames, or multi-frames, each having a duration of 120 milliseconds. Each of the multi-frames is subdivided into twenty six TDMA (Time Division Multiple Access) frames, each having a duration 4.615 milliseconds. Twenty four of the TDMA frames carry voice traffic and two, labelled as "C" in FIG. 1, carry control information. Each of the TDMA frames is further divided into eight time slots of 0.577 milliseconds duration.

Figure 2:
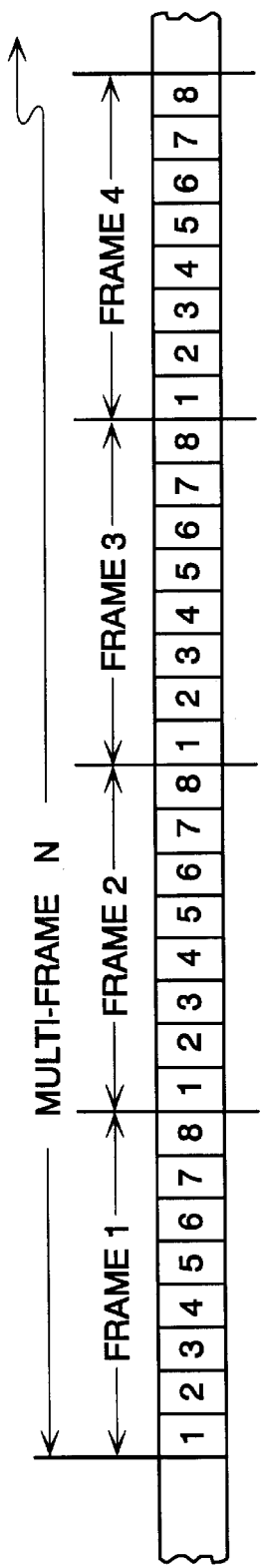
FIG. 2 depicts four frames of multi-frame N shown in FIG. 1.

Time slots are the basic construction unit of the radio channel for end-to-end communication across the radio link. FIG. 2 depicts the eight time slots of each TDMA frame of multi-frame N shown in FIG. 1. Each time slot provides one channel for voice or data communication.

Figure 3:
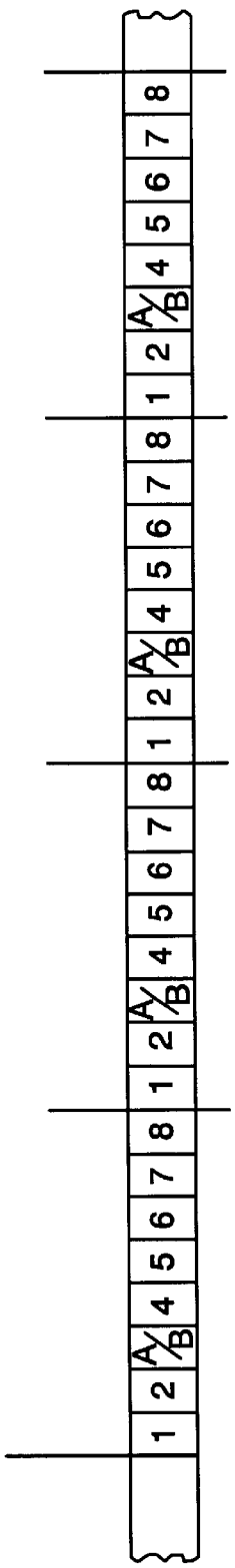
FIG. 3 illustrates four frames of full-rate encoded transmission in a prior art GSM TDM (Time Division Multiplexed) system.

As shown in FIG. 3, full-rate encoding is provided across a channel by successive occurrences of a given time slot. For instance, the digitized, full-rate encoded and expanded voice communication of a conversation between end users A and B may be transmitted during successive occurrences of the third time slot in successive frames. With full-rate encoding, one carrier accommodates eight channels, each of which supports a full-rate voice encoder.

Figure 4:
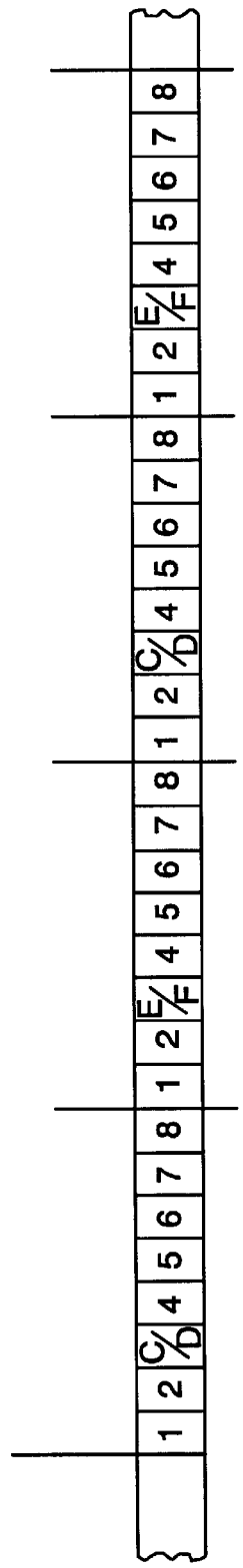
FIG. 4 illustrates four frames of half-rate encoded transmission in a prior art GSM TDM system.

On the other hand, as shown in FIG. 4, half-rate encoding is provided across a channel by occurrences of a given time slot in alternating TDMA frames. For instance, a conversation between end users C and D may appear on occurrences of the third time slot in odd numbered TDMA frames (1, 3, etc.), whereas a conversation between end users E and F may appear on occurrences of the third time slot in even numbered TDMA frames (2, 4, etc.). With half-rate encoding, an RF carrier provides sixteen channels rather than eight. This effectively doubles the capacity of the system.

Figure 5:
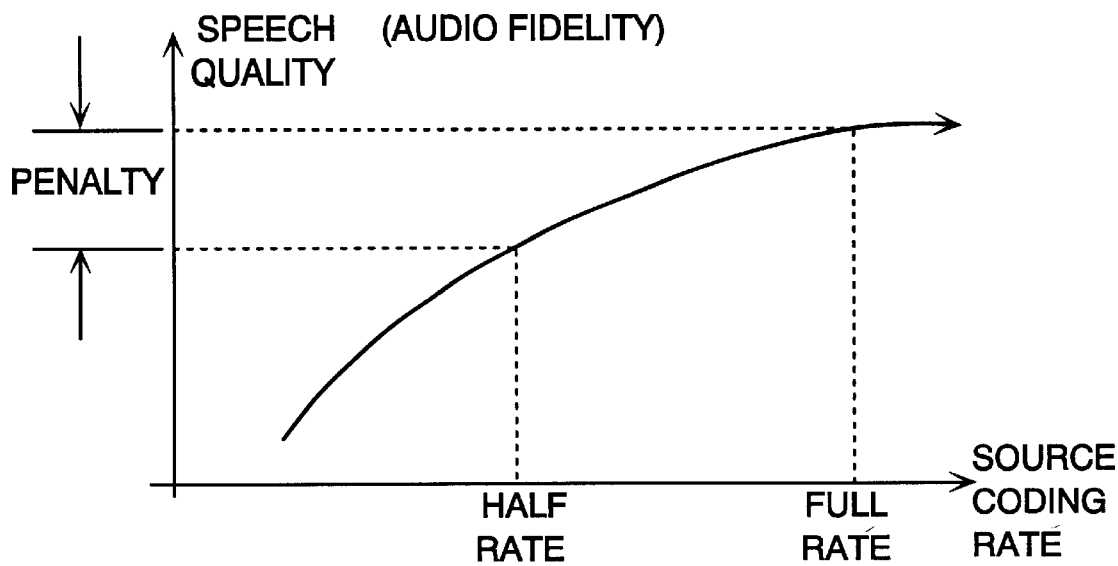
FIG. 5 is a curve of speech quality of a transmitted digitized voice signal as a function of the source encoding rate.

However, as shown in FIG. 5, the penalty to be paid in return for doubling system capacity is that lower bit rate source encoding, e.g., half-rate encoding, goes hand-in-hand with reduced audio fidelity. However, as lower bit rate encoding techniques are improved, the penalty is reduced. This suggests a general principle underlying half-rate systems, namely, that a good half-rate encoder can capture a large part of the fidelity of a full-rate encoder, but require only half the channel bandwidth. Thus, the trade off between fidelity and bandwidth becomes favorable.

Figure 6:
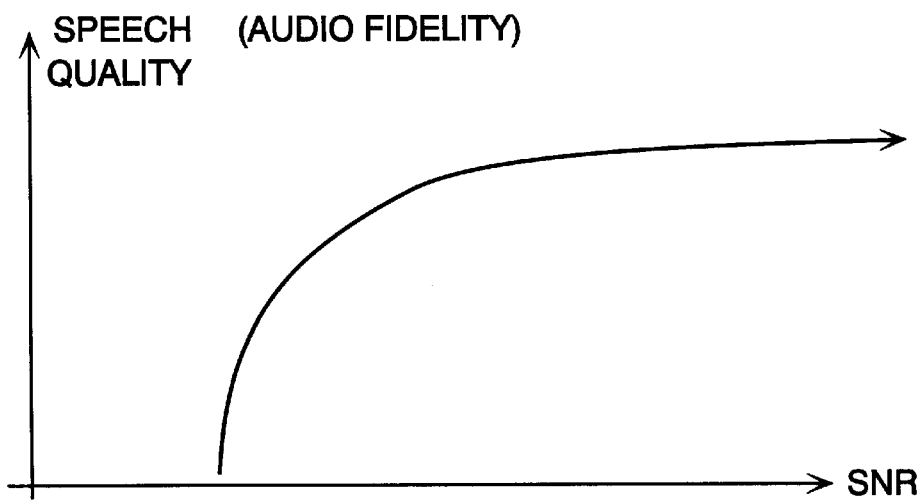
FIG. 6 is a curve of speech quality of a transmitted digitized voice signal as a function of SNR conditions.

Under conditions of low SNR, as shown in FIG. 6, the performance of a low-bit-rate encoder, e.g., a half-rate encoder, can break down. This breakdown in performance becomes a concern in systems which fail to provide adequate SNR for the effective operation of either encoding method, such as, but not limited to, satellite communication systems with a cellular-standard air-interface and extended-range cellular systems. Moreover, communication systems may experience channel fading and/or shadowing of the transmitted signal which may cause a significant reduction in SNR, thereby leading to severely degraded audio quality.

Figure 7:
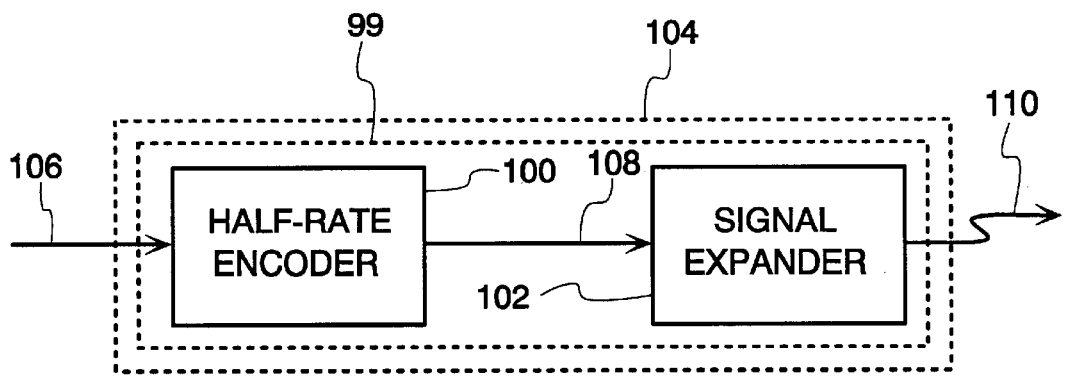
FIG. 7 is a block diagram of a basic form of an enhanced half-rate encoder.
Figure 8:
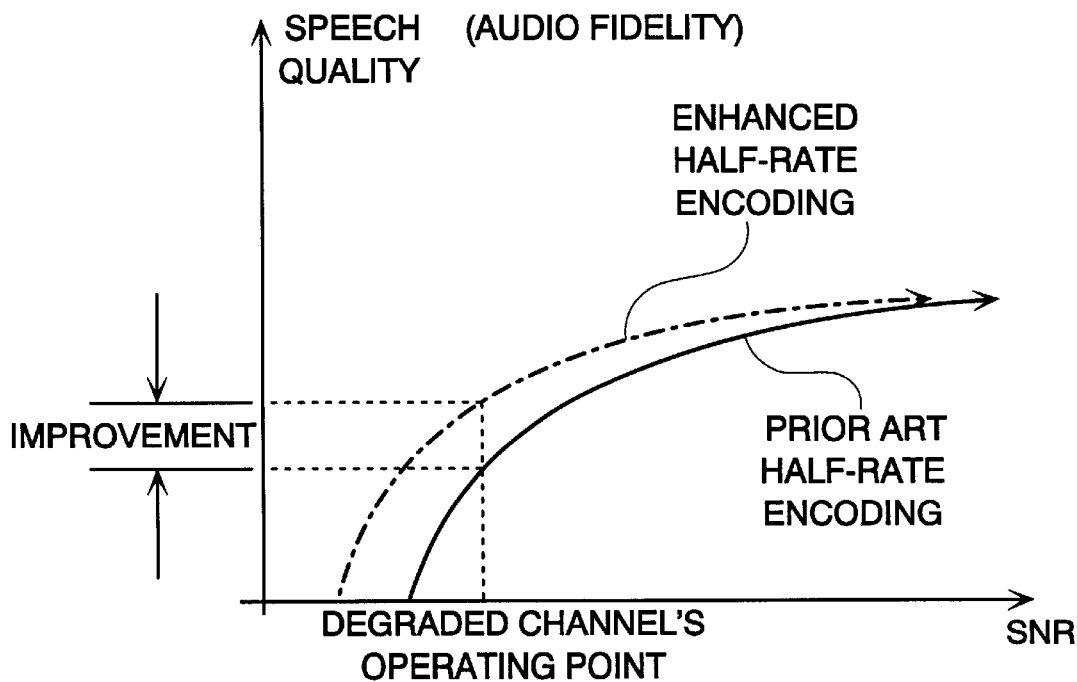
FIG. 8 is a curve of speech quality of a transmitted digitized voice signal as a function of SNR conditions for both enhanced half-rate encoding according to the present invention and prior art half-rate encoding.

In its basic form, as shown in FIG. 7, the enhanced encoder 99 includes a half-rate encoder 100 and a half-to-full rate signal expander 102. The half-rate encoder 100 and signal expander 102 are a part of a transmitter 104 of a wireless voice communication apparatus such as satellites, base stations, cellular phones, and the like. Digitized speech 106 is encoded according to the half-rate source encoder 100. The output 108 of the half-rate encoder 100, at 5.6 kbits/s, is expanded by the signal expander 102 to about twice the bit rate normally associated with half-rate transmission, e.g., to 22.8 kbits/s rather than 11.4 kbits/s, so that the enhanced half-rate speech signal 110 output by the signal expander 102 is transmitted at the rate normally associated with full-rate transmission. As shown in FIG. 8, this enhanced half-rate encoding by enhanced encoder 99 represents approximately a 3 dB improvement in speech quality of the demodulated signal over prior art half-rate encoding.

Figure 9:
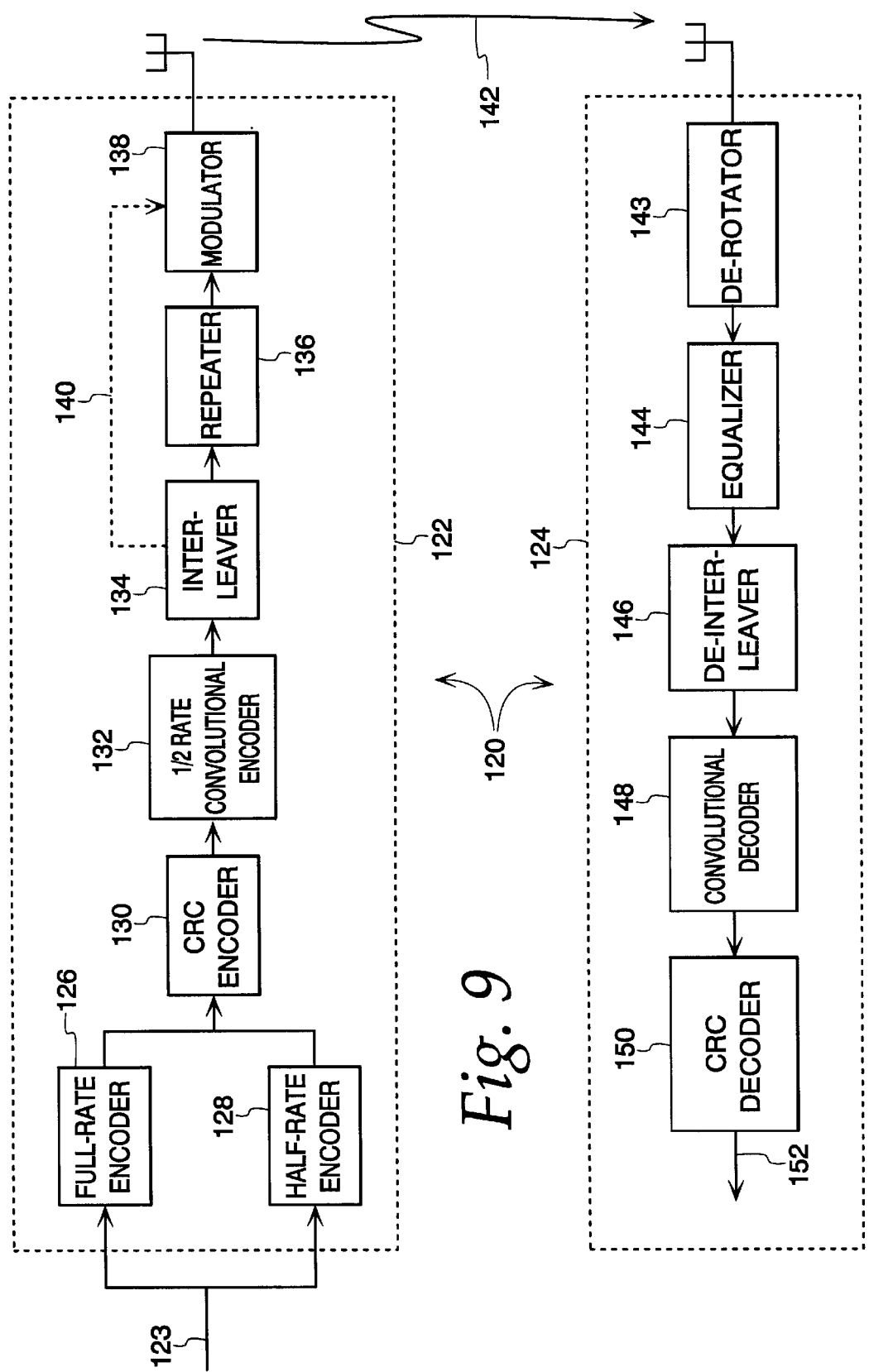
FIG. 9 is a block diagram of a first embodiment of a communication system with enhanced half-rate encoding.

A first embodiment of the enhanced encoder, designed for a radiotelephone system that uses DQPSK (Differential Quadrature Phase Shift Keying) modulation, and more specifically for a D-AMPS (Digital Advanced Mobile Phone System) cellular telephone system, is shown in FIG. 9. The communication system 120 includes a transmitter 122 and a receiver 124, which may be included in any wireless communication devices communicating with each other, such as, but not limited to, satellites, base stations, cellular phones, and the like. The transmitter 122 includes a digitized voice signal input at 123 to a full-rate encoder 126 and a half-rate encoder 128, only one of which is activated at a given time, a CRC (Cyclic Redundancy Check) encoder 130, a ½ rate convolutional encoder 132, an interleaver 134, a repeater 136 which is utilized as the signal expander 102 (see FIG. 7) during enhanced half-rate transmission only, and a modulator 138. Alternately, a switch (not shown) may direct the digitized voice signal 123 to either the full-rate 126 or half-rate 128 encoder.

Figure 10:
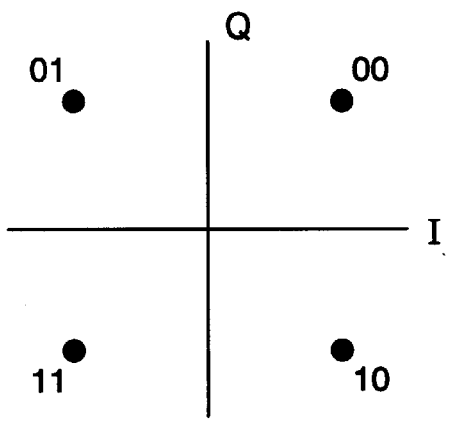
FIG. 10 is a plot of the four possible two-bit states on the real (I) and imaginary (Q) axes of a full-rate encoded signal modulated with π/4-DQPSK (Differential Quadrature Phase Shift Keying) modulation.

If the full-rate encoder 126 is activated, the transmitter 122 will transmit via a standard VSELP full-rate scheme. The ACELP (Algebraic Code Excited Linear Prediction) scheme is similar. The full-rate encoder 126 produces 77 Class I bits and 82 Class II bits every 20 milliseconds (for a rate of 7.95 kbits/s). Twelve of the Class I bits are encoded using a CRC code by the CRC encoder 130, which produces 7 parity bits. The 77 Class I bits, the 7 CRC bits, and 5 tail bits are fed to the ½ rate convolutional encoder 132, which produces 178 coded bits. Those and the uncoded Class II bits add up to 260 bits output by the ½ rate convolutional encoder 132 (for a rate of 13 kbits/s). The 260 bits are fed to an interleaver 134 which interleaves the bits. The interleaved bits follow the dotted path 140, bypassing the repeater 136, to the modulator 138 and are modulated into 130 π/4-DQPSK symbols (each symbol including two bits) in the slot transmission. The 260 bits, taken in successive pairs, or "dibits", are mapped to specific points (00,01,10, 11) on the differential constellation as shown in FIG. 10, which dictates the phase change between symbols in the modulation.

Figure 11:
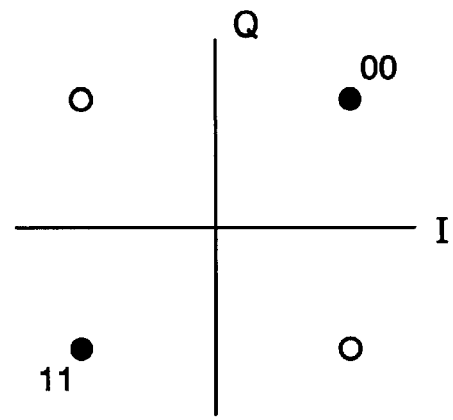
FIG. 11 is the plot of FIG. 10 limited to two possible two-bit states for a half-rate encoded repeated signal.

On the other hand, if the half-rate encoder 128 is activated, 33 Class I bits and 40 Class II bits will be produced every 20 milliseconds by the half-rate encoder 128 (for a rate of 3.65 kbits/s). Twelve of the Class I bits are encoded using a CRC code by the CRC encoder 130, which produces 7 parity bits. The 33 Class I bits, the 7 CRC bits, and the 5 tail bits are fed to the ½ rate convolutional encoder 132, which produces 90 coded bits. Those and the uncoded Class II bits add up to 130 bits (for a rate of 6.5 kbits/s), exactly half of the 260 bits which are transmitted with full-rate encoding. The 130 bits are fed to the interleaver 134 which interleaves the bits. The 130 interleaved bits are then repeated by the repeater 136, bit by bit, with each data bit producing two of the same data bits. That is, 1→11 and 0→00. Taken in pairs, i.e., dibits, the resulting 260 bits are modulated by the modulator 138 using π/4-DQPSK modulation. However, the doubling of the original bits after interleaving, guarantees that only two points (00 and 11) of the differential constellation are used. The use of this "sub-constellation", as shown in FIG. 11, gives us a defacto "π/4-DBPSK" (Differential Binary Phase Shift Keying), and gains approximately 3 dB in performance (audio fidelity) due to the increased Euclidean distance between only two constellation points as opposed to the four constellation points shown in FIG. 10.

In both the full-rate and enhanced half-rate modes of operation described above, the exact number of bits and their classification, along with the rate of the convolutional encoder 132 are exemplary only. Further, conventional half-rate encoding may be added as an additional mode of operation by utilizing line 140 to bypass the repeater 136 with the half-rate encoder 128 activated. Still further, the sub-constellation shown in FIG. 11 is restricted to use over the data field of the frame structure; all other fields (synchronization, SACCH (Slow Associated Control Channel), CDVCC (Coded Digital Verification Color Code), etc.) are transmitted utilizing standard full-rate π/4-DQPSK modulation.

The enhanced half-rate, or "binary modulation" mode of operation described above, effectively expands the half-rate signal to fill the full-rate frame structure, and consequently provides approximately a 3 dB advantage in audio fidelity.

Referring to FIG. 9, the transmitted signal 142 is received at the receiver 124 and the steps performed at the transmitter 122 are essentially performed in reverse. The signal is first de-rotated by de-rotator 143, then demodulated by the equalizer 144, de-interleaved by de-interleaver 146, decoded by convolutional decoder 148, and further decoded with a CRC decoder 150. The resulting received digital signal 152 may be further processed for providing the signal in analog form to a user.

With enhanced half-rate encoding at the transmitter 122, in order for the equalizer 144, preferably a Viterbi equalizer, to handle the binary modulation properly, half of the branches on its trellis need to be disabled. The remaining parts of the equalizer 144, including the channel tracker (not shown), require no modification. On the other hand, if a differential detector is utilized at the receiver 124 in place of the equalizer 144, no modification is required in order to demodulate the transmitted binary modulated signal. For convenience, it is assumed that enhanced half-rate encoding was utilized at the transmitter 122, such that the transmitted signal 142 is a binary signal and the equalizer 144 is a binary equalizer.

The binary equalizer 144 is preferably a 2-tap channel model equalizer, typically resulting in a fully connected 4-state trellis. Since the D-AMPS modulation scheme is typically π/4-DQPSK, the de-rotator 154 de-rotates the received binary signal 142 before feeding it to the equalizer 144. De-rotation removes the π/4 shift from the π/4-DQPSK modulation, effectively resulting in DQPSK modulation.

In DQPSK, two information bits determine the phase transition $\phi_n$ from the present coherent phase $\theta_{n-1}$ to the next coherent phase $\theta_n$, using the equation $$\theta_n = \theta_{n-1} + \phi_n.$$

Both the phase transition and the coherent phase belong to the set $\{0, \pi/2, \pi, 3\pi/2\}$. The coherent symbols (or constellation points) $S_n$, are given by $$S_n = e^{j\theta_n}$$

and belong to the set $\{+1, +j, -1, -j\}$. One stage of the trellis is described below in Table 1, including the present state and the coherent symbol and phase associated with the present state and the information bits and the phase transition associated with the information bits. Each transition ending in a given state is labelled with the coherent symbol associated with that state, e.g., all four transitions ending in state 0 are labelled =1.

TABLE 1

Standard trellis for D-AMPS after de-rotation

| Present State | Coh. Symbol (Phase) | Information bits (phase transition) | | | |
|---|---|---|---|---|---|
| | | 00(0) | 01(π/2) | 11(π) | 10(3π/2) |
| | | Next state | | | |
| 0 | +1 (0) | 0 | 1 | 2 | 3 |
| 1 | +j (π/2) | 1 | 2 | 3 | 0 |
| 2 | −1 (π) | 2 | 3 | 0 | 1 |
| 3 | −j (3π/2) | 3 | 0 | 1 | 2 |

With binary modulation, the information bit pairs are restricted to 00 and 11. In a trellis constrained accordingly, states 0 and 2 become disconnected from states 1 and 3. That is, a path on the constrained trellis that visits state 0 can also visit state 2, but not states 1 or 3, and vice versa. It is assumed that the subtrellis with states 0 and 2, i.e., the binary trellis, is the trellis used by the binary equalizer 144 for the binary demodulation. This is shown in Table 2. For the standard trellis, once a path has been chosen, the corresponding bit pairs are produced by the equalizer as hard information. For the binary trellis, the bit pairs 00 and 11 map into the unrepeated bits 0 and 1, respectively, which are produced by the binary equalizer 144 as hard information.

TABLE 2

Modified trellis for binary modulation after de-rotation

| Present State | Coh. Symbol (Phase) | Information bits (phase transition) | |
|---|---|---|---|
| | | 00(0) | 11(π) |
| | | Next state | |
| 0 | +1 (0) | 0 | 2 |
| 2 | −1 (π) | 2 | 0 |

In addition to hard information, the binary equalizer 144 produces soft information, in the form of dibits, which is used by the convolutional decoder 148 in decoding the received signal. This soft information is a real number whose value is indicative of the likelihood of the accuracy of the produced hard information or bit. The soft information is somewhat complicated because of the differential encoding inherent in π/4-DQPSK modulation. Below is a summary of the operation of the binary equalizer 144 in producing soft information.

Figure 12:
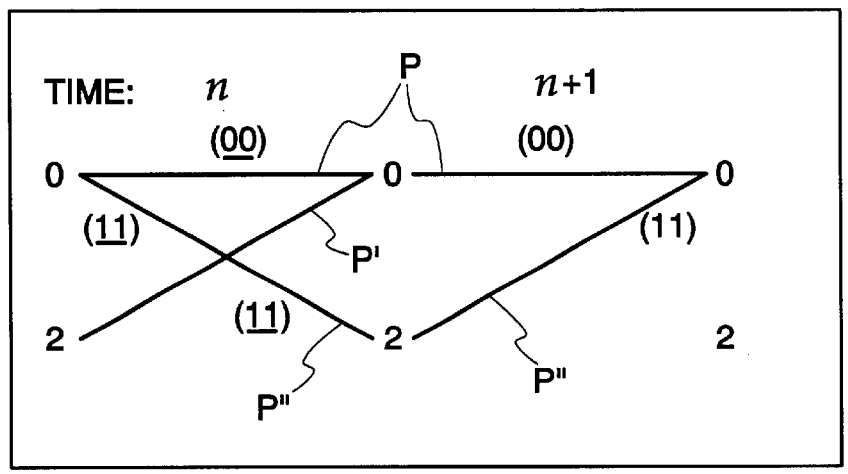
FIG. 12 illustrates soft value computation in the binary equalizer shown in FIG. 9.

In Table 2, the current information bit pair at time n depends on the current and next coherent symbols. It is assumed that hard decisions have already been made on the current transition and the next transition and a hard bit has been output. This is illustrated by the example in FIG. 12, where the surviving path corresponding to the hard decision is $$P = (0 \rightarrow 0 \rightarrow 0),$$

which translates to bit 0, i.e., the binary equalizer has output bit 0 as hard information at time n. In order to obtain a soft value for the first bit, or MSB (Most Significant Bit) relating to bit 0 at time n (represented by the underlined pair 00), occurrences of bit 1 (represented by pair 11) at time n are sought. More specifically, the path metrics of bit 0 at time n, namely, $M_n$ at time n and $M_{n+1}$ at time n+1 (time n+1 being used due to the dependency of the current information bit pair on the next coherent symbol), are compared with the metrics of paths that would have produced bit 1 at time n. Since the binary trellis of Table 2 is utilized in the binary equalizer 144, there are only two alternate paths, namely, $$P' = (2 \rightarrow 0),$$

at time n, with path metric $M'_n$ ($>M_n$, since P is the surviving path at time n), and $$P'' = (0 \rightarrow 2 \rightarrow 0),$$

at time n+1, with path metric $M''_{n+1}$ ($>M_{n+1}$, since P is the surviving path at time n+1). Note that the second transition from $2 \rightarrow 0$ was necessary in path P" since reliable comparison of metrics requires that they have paths ending in the same state (state 0 in the above example). It then follows that a reasonable soft value for the MSB is $$\min (M'_n - M_n, M''_{n+1} - M_{n+1}).$$

Either the full-rate encoder 126 or the half-rate encoder 128 may be implemented by the transmitter 122 for transmission. Thus, the receiver 124 needs to be able to tell which transmission mode is being utilized in order to activate an appropriate equalizer (standard 4-state for full-rate encoding and modified 2-state for enhanced half-rate encoding) to properly demodulate the received signal. If the receiver 124 is aware of which encoding scheme is being utilized by the transmitter 122, the appropriate equalizer can be easily activated. However, where the receiver 124 is unaware of which encoding scheme is being utilized, it must be able to determine which encoding scheme is being utilized and activate the appropriate equalizer.

Figure 13:
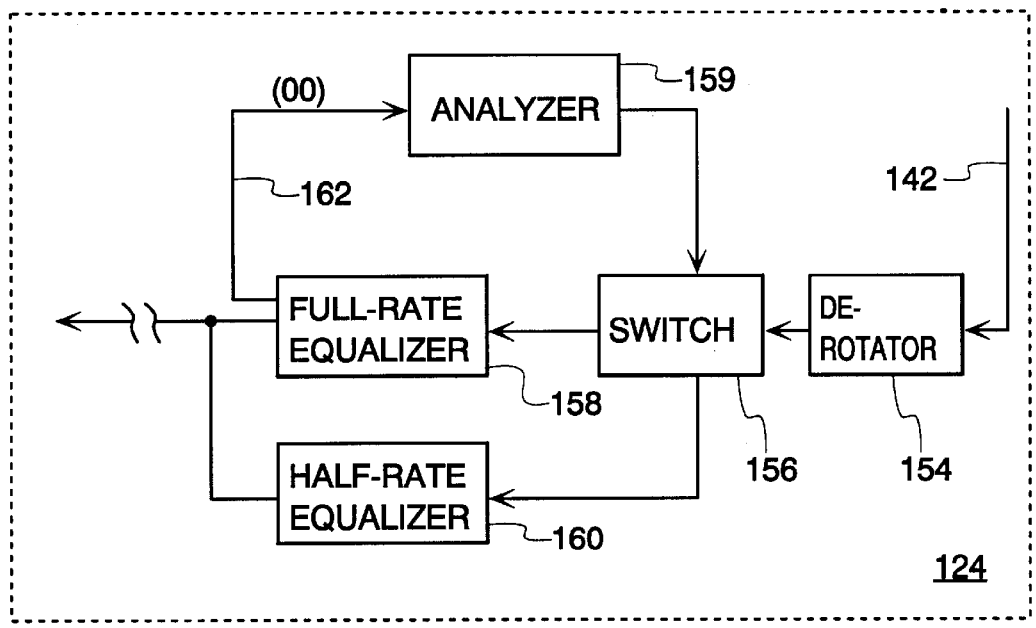
FIG. 13 is a block diagram of the de-rotator and equalizer shown in FIG. 9.

Referring to FIG. 13, the receiver 124 is illustrated which determines the encoding scheme of the transmitted digital signal 142 and chooses an appropriate equalizer. Upon receipt of the transmitted digital signal 142, it is de-rotated by de-rotator 154 and fed through a switch 156 to a standard full-rate equalizer 158 having a 4-state trellis. The full-rate equalizer 158 is chosen as the starting equalizer since it will operate on the binary modulated signal, albeit with a loss in performance. If binary modulation is used, it is detected by the analyzer 159 quickly and the half-rate equalizer 160 is activated before suffering a significant degradation of the received signal.

It is assumed that synchronization and downsampling to symbol rate samples have been performed, and the equalizer 158 has demodulated the signal producing "soft bits" at the output. These soft bits are real numbers, i.e., a stream of 0's and 1's, analogous to the projection of a differential constellation point (see FIG. 10) on the I (real) and Q (imaginary) axes.

Once demodulation has been performed yielding "soft bits" 162, the soft bits 162 are fed to the analyzer 159 which determines whether full-rate encoding or enhanced half-rate encoding has been performed at the transmitter 122. The analyzer 159 instructs the switch 156 whether full-rate or enhanced half-rate encoding has been utilized, and if enhanced half-rate encoding has been utilized, the analyzer 159 will instruct the switch 156 to switch to the enhanced half-rate equalizer 160 having a 2-state trellis.

Figure 14:
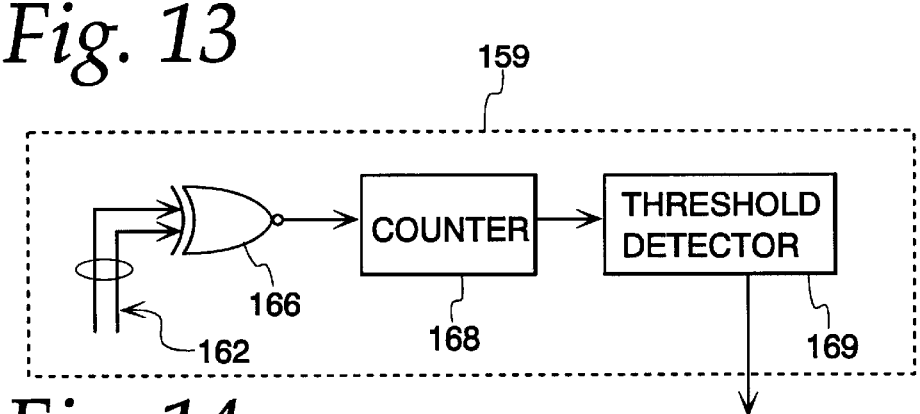
FIG. 14 is a block diagram of one form of the analyzer shown in FIG. 13.

In one form, as shown in FIG. 14, the analyzer 159 performs a simple hard detection of the soft bits, or dibits, i.e., two bits, 162 (a negative soft value maps to a logical "1", and a positive soft value maps to a logical "0"). The resulting stream of 0's and 1's can be examined for the occurrence of double ones and double zeros. An example of a circuit which will perform this is an XNOR gate 166 operating on each bit of a dibit. If the bits of the dibit are the same, the output of the XNOR gate 166 will be a "1". If the bits of the dibit are different, the output of the XNOR gate 166 will be a "0". This output can be used to increment a counter 168, which counts the occurrence of double bits. A threshold detector 169 is connected to the counter 168. If the count exceeds the threshold, the threshold detector 169 sends a signal to the switch 156 indicating that enhanced half-rate encoding is being used and to switch to the half-rate equalizer 160. This circuit may be easily implemented in ASIC (Application Specific Integrated Circuit) circuitry.

Figure 15:
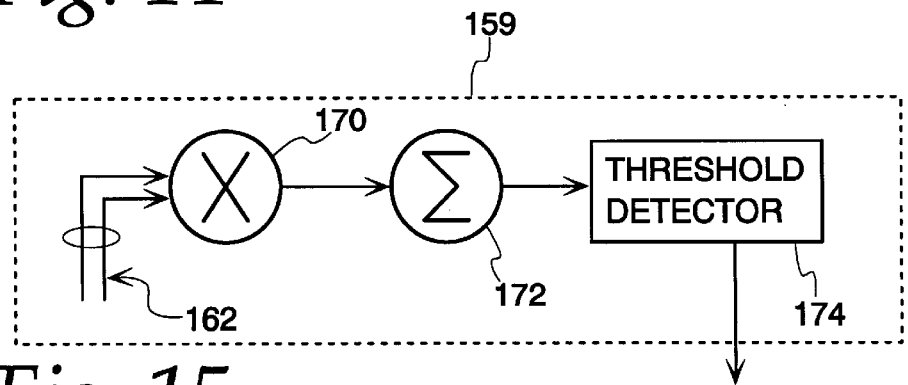
FIG. 15 is a block diagram of an alternative form of the analyzer shown in FIG. 13.

In another form, referring to FIG. 15, the analyzer 159 determines the modulation scheme being utilized by multiplying the soft values of the soft bits 162 of the dibit together. The soft bits 162 of the dibit are fed to a multiplier 170 which multiplies the soft values. If the enhanced half-rate modulation scheme is being used, then the adjacent soft values of the dibit will be of like polarity (indicating a double bit), and the product of the two will be positive. If the full-rate modulation scheme is being utilized, half of the dibits will have adjacent soft values of different polarity, and thus these products will be negative. The output of the multiplier 170 is input to a summer 172 which sums the products over all or a portion of the data field of the received burst signal. If the full-rate modulation scheme is being used, the sum will be biased toward zero. Alternatively, if the half-rate modulation scheme is being used, the sum will be positively biased. Accordingly, the output of the summer 172 is fed to a threshold detector 174 which employs a threshold to determine the modulation scheme being utilized, and transmits the appropriate signal to the switch 156.

Figure 16:
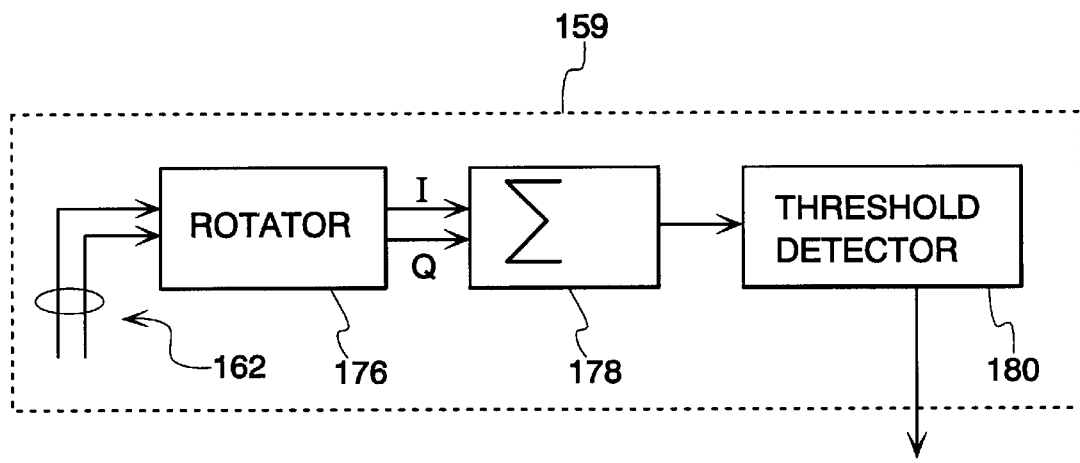
FIG. 16 is a block diagram of another alternative form of the analyzer shown in FIG. 13.
Figures 17, 18:
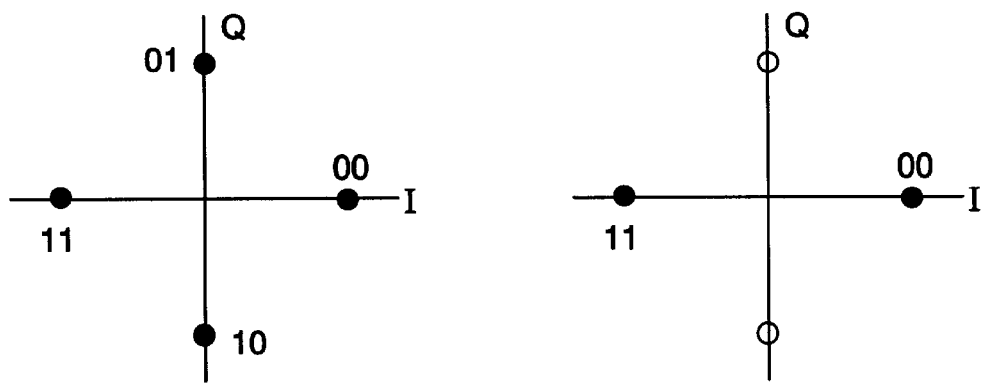
FIG. 17 is a plot of the differential constellation of FIG. 10, rotated by π/4.
FIG. 18 is a plot of the differential "sub-constellation" of FIG. 11, rotated by π/4.

In yet another form, referring to FIG. 16, the analyzer 159 takes advantage of the fact that the differential operation performed by the equalizer 158 on the received coherent symbols produces a differential constellation of differential symbols, where the phase of a constellation point corresponds to the π/4-DQPSK phase change. The soft bits (dibits) 162 produced by the equalizer 158 are plotted on a differential constellation having real and imaginary axes, each plotted soft dibit represents a complex value of a differential symbol. The differential symbols are rotated by rotator 176 so that the constellation points of an enhanced half-rate modulated signal lie on the real (I) axis. Essentially, the rotator 176 multiplies the differential symbols of the constellation by a constant, exp (jπ/4). FIG. 17 illustrates rotation of the differential constellation of FIG. 10 by π/4, while FIG. 18 illustrates rotation of the differential "sub-constellation" of FIG. 11 by π/4.

Referring back to FIG. 16, once this rotation is performed, activity on the I and Q axes is observed to determine the modulation scheme being used. If full-rate encoding modulation is being used, there will be equal energy in the I and Q axes on average, with all symbols of the DQPSK constellation being employed. If enhanced half-rate encoding is being used, then almost all of the energy over the data field of the received burst signal will be in the I (real) component.

This can be quantified by summing the magnitudes of the I and Q components, via summation block 178, and comparing then in the ratio, $$R = \frac{\sum_n |I_n|^2}{\sum_n |Q_n|^2}.$$

If full-rate encoding is being employed, then the ratio R will be close to 1. If enhanced half-rate encoding is being employed, then the ratio R will a number much larger than 1. The output of the summation block 178, which is the ratio R, is fed to a threshold detector 180 which employs a threshold to determine which scheme is being employed and sends the appropriate signal to the switching device 156.

Figure 19:
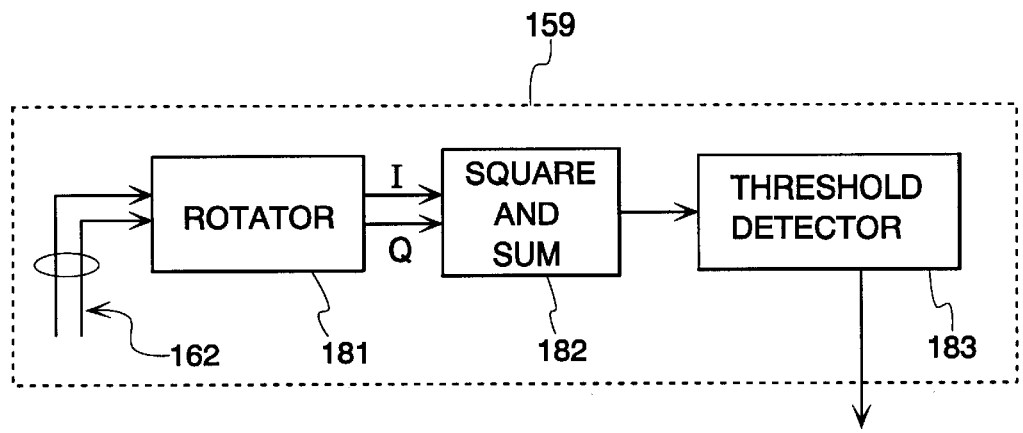
FIG. 19 is a block diagram of still another alternative form of the analyzer shown in FIG. 13.

In still another form, referring to FIG. 19, the analyzer 159 again takes advantage of the fact that the differential operation performed by the equalizer 158 on the received coherent symbols produces a differential constellation of differential symbols, where the phase of a constellation point corresponds to the π/4-DQPSK phase change. The soft bits (dibits) 162 produced by the equalizer 158 are plotted and rotated by rotator 181 in the same manner as rotator 176 previously described with respect to FIG. 16. Once the rotation is performed, activity on the I and Q axes is observed to determine the modulation scheme being used. If full-rate encoding modulation is being used, the average value of the squared values of the QPSK samples will be:

$$avg_{QPSK} = \frac{1}{4}(1)^2 + \frac{1}{4}(j)^2 + \frac{1}{4}(-1)^2 + \frac{1}{4}(-j)^2$$
$$= 0 + j0.$$

If enhanced half-rate encoding is being used, the average value of the squared values of the BPSK samples will be:

$$avg_{BPSK} = \frac{1}{2}(1)^2 + \frac{1}{2}(-1)^2$$
$$= 1 + j0.$$

This can be quantified by squaring and summing the complex values of the rotated differential symbols, via square and sum block 182.

If full-rate encoding is being employed, then the real part of the squared/summed value will be close to 0. If enhanced half-rate encoding is being employed, then the real part of the squared/summed value will be close to 1. The output of the square and sum block 182, which is the real part of the average value, is fed to a threshold detector 183 which employs a threshold to determine which scheme is being employed and sends the appropriate signal to the switching device 156.

Figure 20:
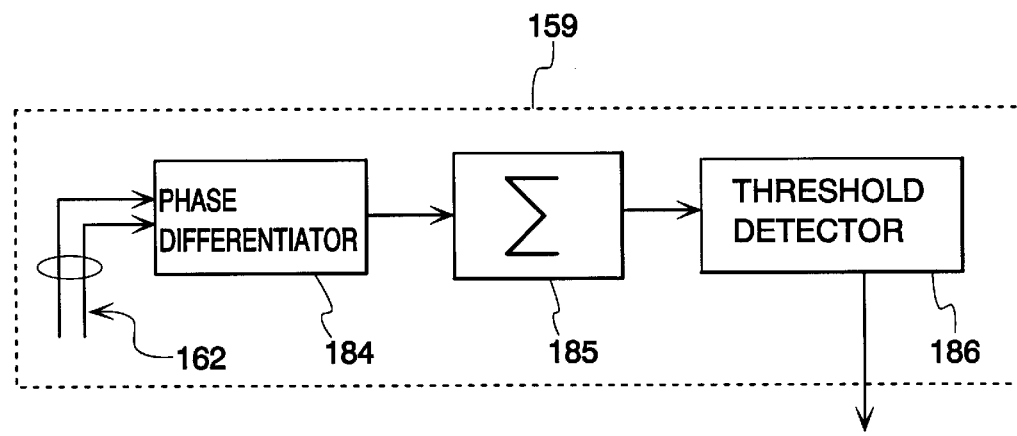
FIG. 20 is a block diagram of yet another alternative form of the analyzer shown in FIG. 13.

In some situations, the complex received data available, i.e., soft bits 162, is in magnitude-phase format, i.e., in terms of a real number magnitude and a real number phase describing the demodulated constellation point. Differential detection can be performed without a polar-to-rectangular conversion simply by taking the difference between the phases of successive coherent or differential symbols represented by the soft dibits. As shown in FIG. 20, in still another form the analyzer 159 includes a phase differentiator 184 which determines the difference between the phases of successive differential symbols. The phase difference information from the phase differentiator 184 is analyzed to determine the type of encoding being used. If full-rate encoding is being used, then the average phase change will be $\Delta\phi_{avg}=¼(\pi/4)+¼(-\pi/4)+¼(3\pi/4)+¼(-3\pi/4)=0$, since all differential symbols (phase changes) occur with equal likelihood. If enhanced half-rate encoding is being used, then the average phase change will be $\Delta\phi_{avg}=½(\pi/4)+½(-\pi/4)=\pi/4$. The output of the phase differentiator is fed to a summation block 185 which estimates the average phase change over the data field by summing the phase changes at the output of the differentiator 184. If full-rate encoding is being employed, then the sum of the phase changes will be close to 0. Otherwise, if enhanced half-rate encoding is being used, the sum will be close to $\pi/4$. The output of the summation block 185 is fed to a threshold detector 186 which utilizes a threshold value to determine whether enhanced half-rate encoding is being employed and transmits an appropriate signal to the switching device 156. Attention should be paid, however, to the modulo nature of the angle measurement in making this accumulation, since some scaling may be required before summing the values.

Figure 21:
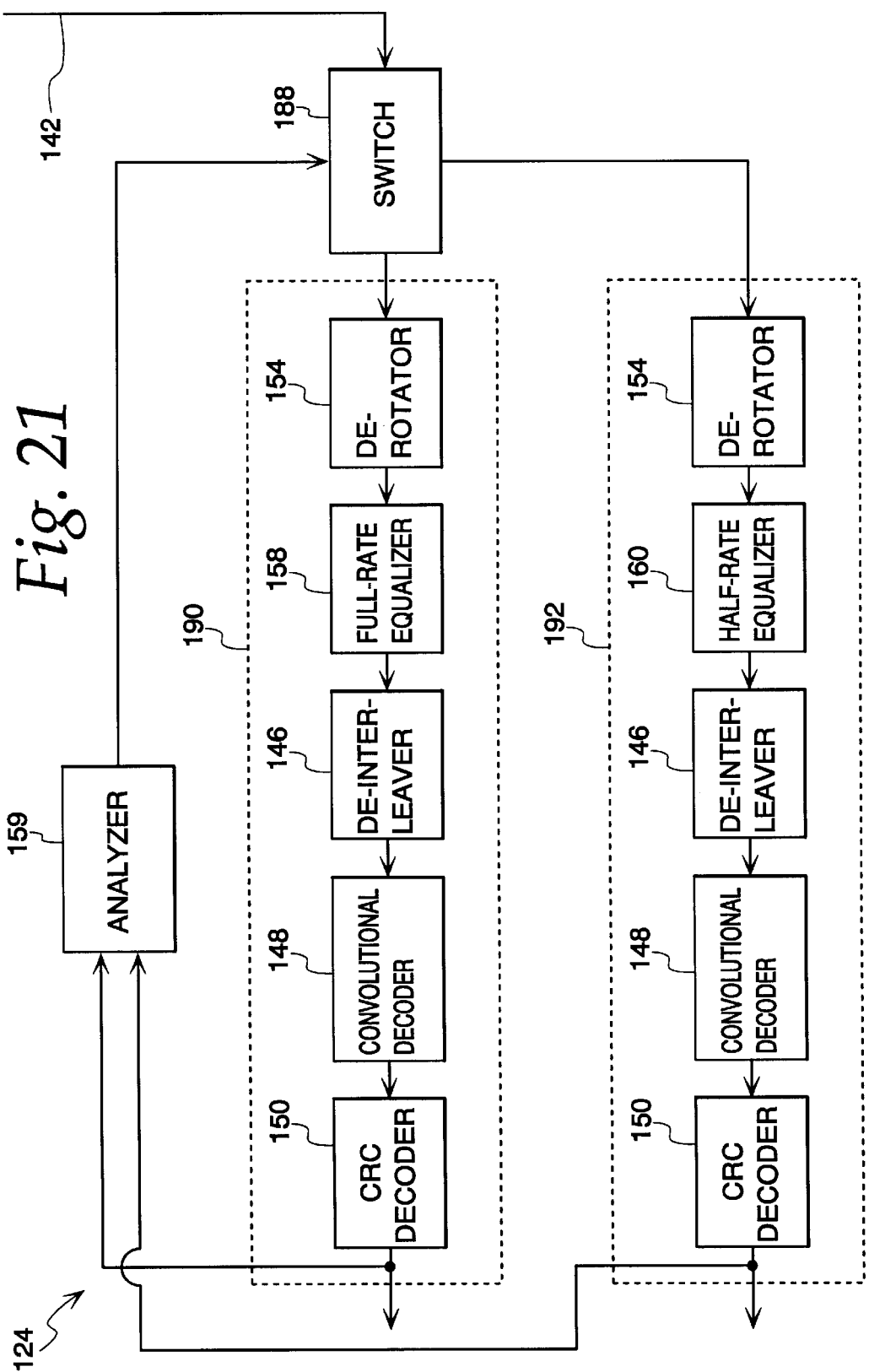
FIG. 21 is a block diagram of another embodiment of the receiver shown in FIG. 9.

Alternatively, as shown in FIG. 21, the received digital signal 142 may be demodulated in parallel using both full-rate and enhanced half-rate branches. The transmitted digital signal 142 is received by a switch 188 at the receiver 124, which initially transmits the received signal to both the full-rate demodulation 190 and half-rate demodulation 192 branches. The signal is demodulated and processed by the full-rate demodulation branch 190 as if it were transmitted with full-rate $\pi/4$-DQPSK modulation, while at the same time the signal is demodulated and processed by the half-rate modulation branch 192 as if it were transmitted with half-rate $\pi/4$-DBPSK modulation. Both branches result in demodulated, decoded data, and the result of the CRC decoder 150 in each branch is fed to the analyzer 159. The analyzer 164 determines in which branch the CRC code checks out, and sends a signal to the switch 188 instructing the switch 188 to activate only that particular branch.

A second embodiment of the high performance enhanced half-rate encoder applies generally to radiotelephone systems and is not restricted to D-AMPS or differential phase-shift modulation. This second embodiment uses additional channel encoding to expand the half-rate signal to fit the full-rate frame structure.

The bits output by a source encoder have different importance to the fidelity of the reconstructed signal. Errors in some bits cause more psychoacoustic disruption to the reconstructed audio signal than errors in other bits. To optimize the fidelity of the reconstructed signal, bits output by the source encoder are generally assigned to classes ranked in importance and, based on the class, the channel encoder provides different degrees of redundancy to each class.

Figure 22:
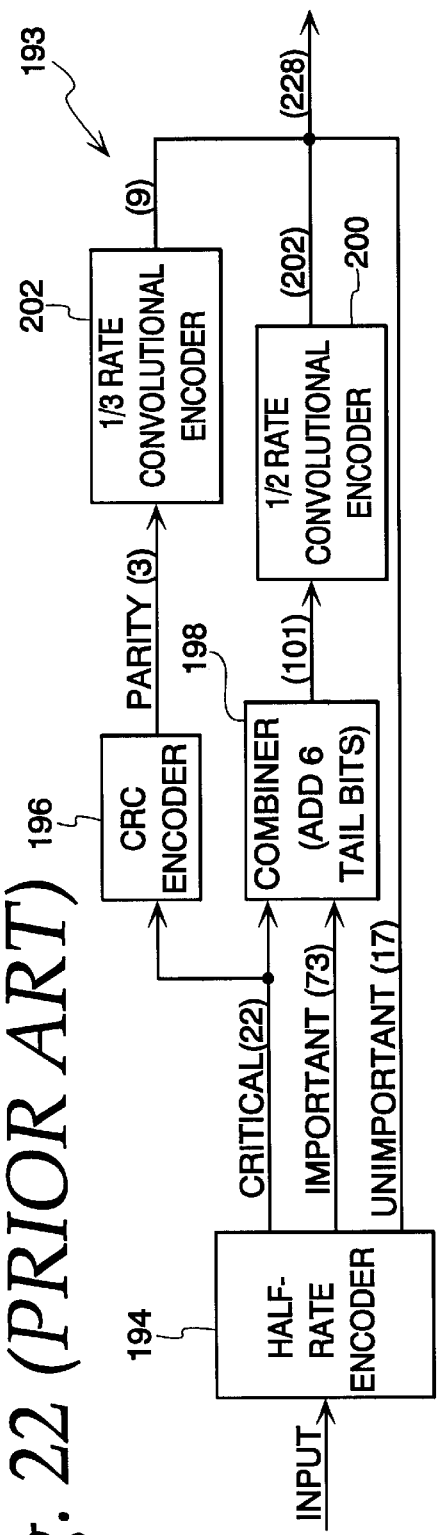
FIG. 22 is a block diagram of a prior art encoder utilizing half-rate encoding.

For example, as shown in FIG. 22, at the prior art transmitter 193, the 112 bits produced every 20 milliseconds by a half-rate encoder 194 are classified as twenty two critical bits, seventy three important bits, and seventeen unimportant bits. The critical bits are encoded by a CRC encoder 196 which produces three parity bits. Further, the twenty two critical bits are combined with the seventy three unimportant bits, and with six tail bits, by combiner 198. The one hundred and one bits output from combiner 198 are encoded by a ½ rate convolutional encoder 200, producing two hundred and two bits therefrom. The three parity bits are encoded by a ⅓ rate convolutional encoder 202, which produces nine bits. Thus, there is a grand total two hundred and eleven encoded bits. The seventeen unimportant bits are not encoded but are combined with the two hundred and eleven protected bits bringing the total bit count to two hundred and twenty eight bits per 20 milliseconds.

Figure 23:
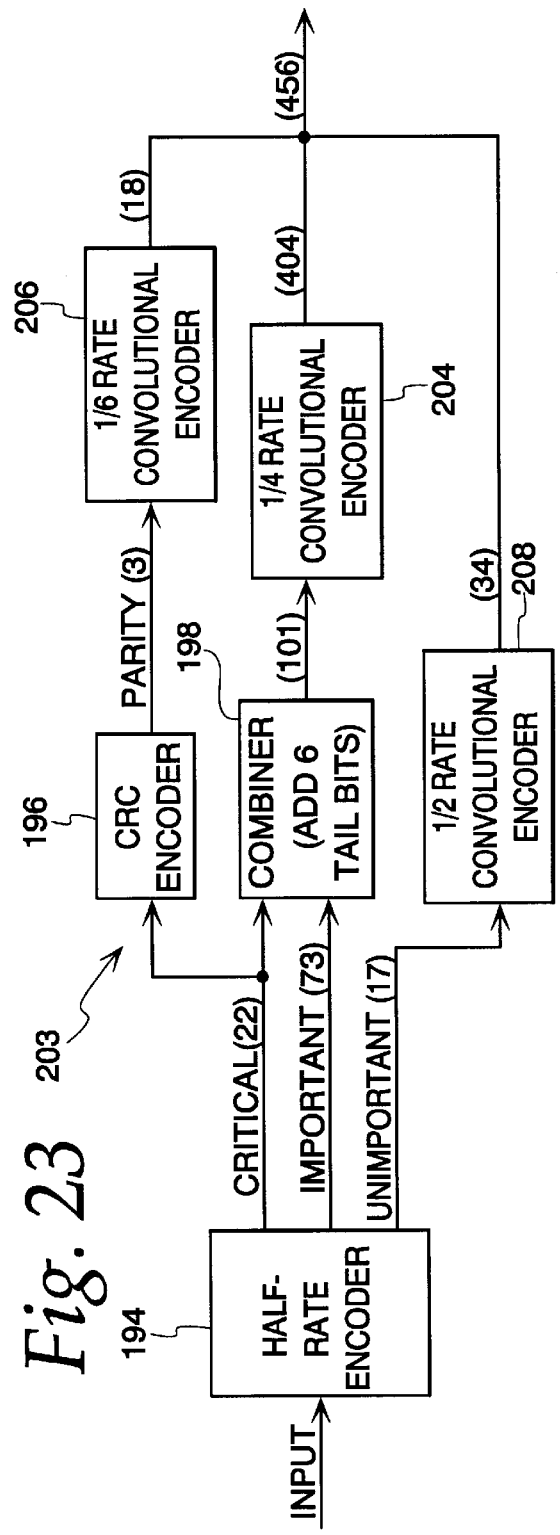
FIG. 23 is a block diagram of a modified enhanced half-rate encoder.

In the second embodiment in transmitter 203, the half-rate encoder of the transmitter of FIG. 22 is enhanced, as shown in FIG. 23. The half-rate encoder 194 again produces twenty two critical bits, seventy three important bits, and seventeen unimportant bits. The twenty two critical bits are encoded by the CRC encoder 196 which produces three parity bits. The twenty two critical bits are combined with the seventy three important bits, and with six tail bits, by the combiner 198, producing one hundred and one bits. The one hundred and one bits output by the combiner 198 are encoded by a ¼ rate convolutional encoder 204, producing four hundred and four bits therefrom. The three parity bits are encoded by a ⅙ rate convolutional encoder 206, producing eighteen bits and giving a grand total of 422 encoded bits. The seventeen unimportant bits are encoded by a ½ rate convolutional encoder 208, producing thirty four bits therefrom, for a grand total of four hundred and fifty six bits, or twice the ordinary output of the half-rate encoder every 20 milliseconds. This arrangement not only provides greater overall protection against transmission errors, but it also provides some degree of protection to all bits.

Figure 24:
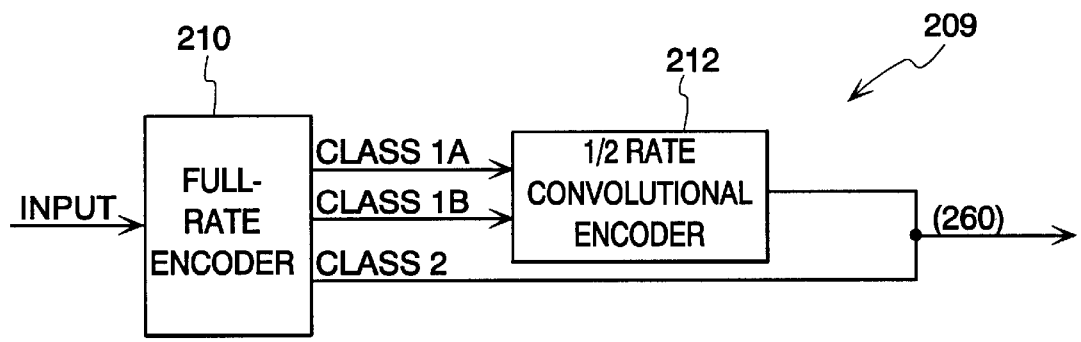
FIG. 24 is a block diagram of a prior art full-rate encoder.

A prior art variant of the encoder of FIG. 22 for use with a D-AMPS system is shown in FIG. 24. It is assumed that the half-rate encoder is being employed on a fill-rate channel. Generally, a full-rate IS-136 channel has a capacity of 260 bits every 20 milliseconds, whereas a half-rate channel requires a capacity of 260 bits every 40 milliseconds. A transmitter 209 is shown for transmitting on a full-rate channel. The transmitter 209 includes a full-rate encoder 210 producing three classes of bits, namely, class 1A (critical), class 1B (important) and class 2 (unimportant). The class 1A and 1B bits are encoded by a ½ rate convolutional encoder 212. The output of the encoder 212 and the class 2 bits are combined to produce 260 bits every 20 milliseconds.

Figure 25:
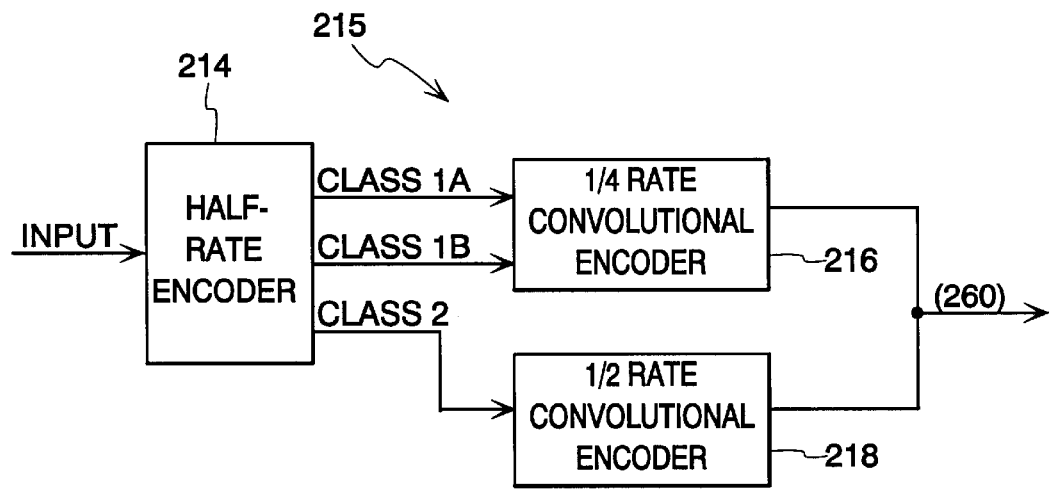
FIG. 25 is a block diagram of a variant of the enhanced half-rate encoder shown in FIG. 23.

Referring to FIG. 25, a transmitter 215 is shown for transmitting a half-rate encoded signal on a full-rate channel. The transmitter 215 includes a half-rate encoder 214 producing three classes of bits, namely, class 1A, class 1B and class 2. However, in order to increase the output of the half-rate encoder 214 to utilize the full-rate channel condition, additional encoding is necessary. The class 1A and 1B bits are encoded by a ¼ rate convolutional encoder 216. The class 2 bits are encoded by a ½ rate convolutional encoder 218. The output of the encoders 216 and 218 are combined and produce 260 bits every 20 milliseconds, thus filling the full-rate channel conditions.

Figure 26:
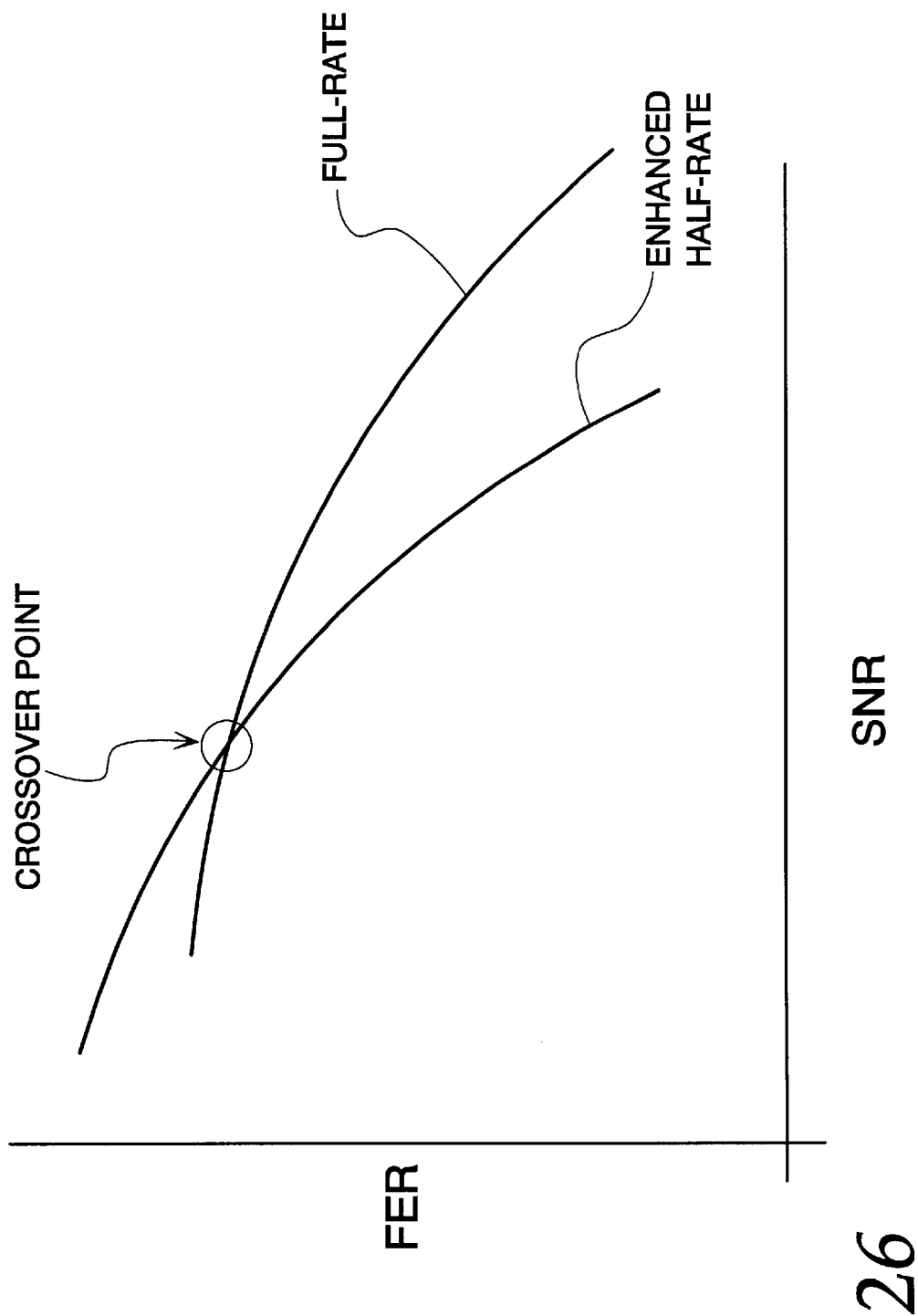
FIG. 26 is a plot of FER (Frame Error Rate) of transmitted digitized voice signals as a function of SNR conditions for both enhanced half-rate encoding (FIG. 25) and prior art full-rate encoding (FIG. 24)

While the additional encoding illustrated in FIG. 25 minimizes the FER (Frame Error Rate) of the half-rate encoder 214, there is a crossover point in the performance of the half-rate encoder 214 in comparison to the full-rate encoder 210, as shown in FIG. 26.

It should be understood that the additional encoding of FIG. 25 is exemplary. Other supplemental encoding could be used. Moreover, other additional encoding could be utilized, such as, but not limited to, trellis-coded modulation, block-coded modulation, product codes, and the like.

Figure 27:
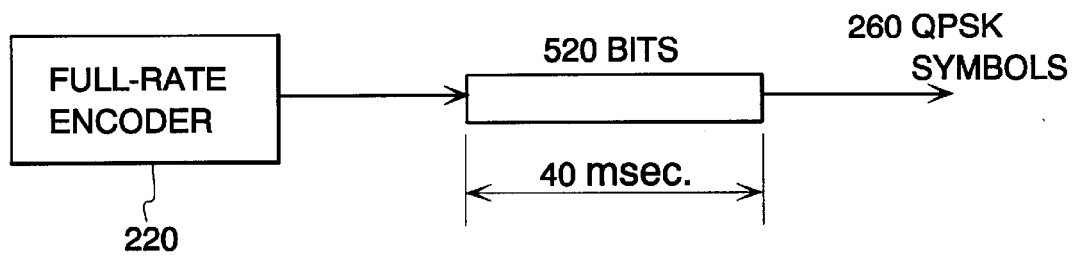
FIG. 27 is a diagram illustrating operation of a prior art full-rate encoder.
Figure 28:
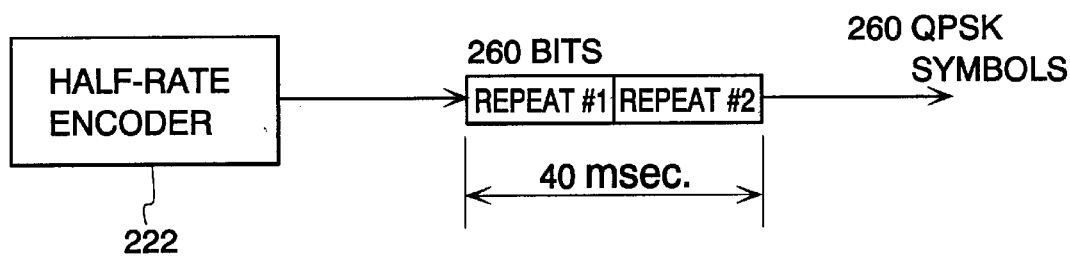
FIG. 28 is a diagram illustrating operation of another embodiment of the enhanced half-rate encoder.

In a third embodiment of enhanced half-rate channel encoding, each encoded 20 millisecond speech segment is twice repeated. As shown in FIG. 27, a prior art full-rate encoder 220 produces five hundred and twenty bits every 40 milliseconds resulting in two hundred and sixty QPSK symbols. As shown in FIG. 28, each 20 millisecond speech segment output of a half-rate encoder 222 is repeated, resulting in two hundred and sixty QPSK symbols, the same as if the full-rate encoder 220 was utilized.

Figure 29:
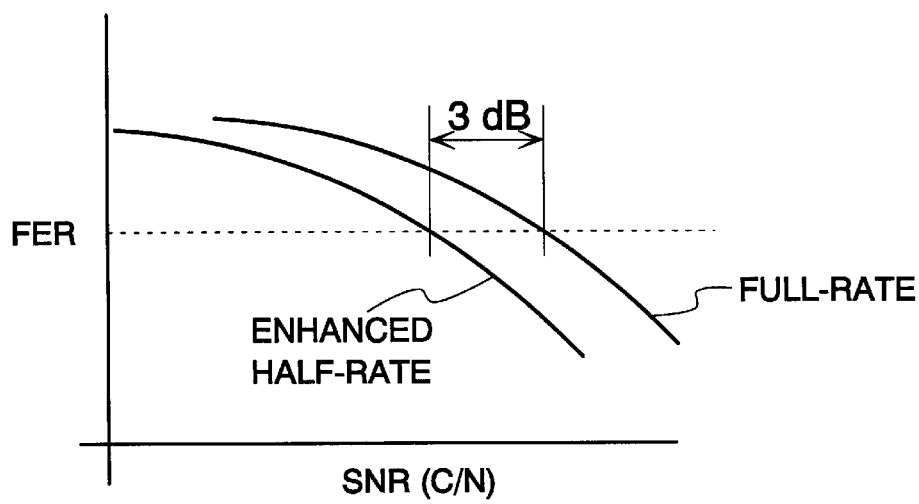
FIG. 29 is a curve of the FER of a transmitted digitized voice signal as a function of SNR conditions for both enhanced half-rate encoding (FIG. 28) and prior art full-rate encoding (FIG. 27)

Repetition of the 20 millisecond speech segments, results in an approximate 3 dB gain in performance as shown in the curves of enhanced half-rate and full-rate encoding of FIG. 29. Further, the FER is minimized at low SNR. Moreover, there is potential for diversity gain, since channel fading can be different on the two repeats. However, under low SNR conditions, this diversity gain will be marginal. It should be understood that if a GSM system is implemented, two hundred and twenty eight bits would be sent in the first slot of the full-rate pair, and the same two hundred and twenty eight bits would be repeated in the second slot of the pair.

Figure 30:
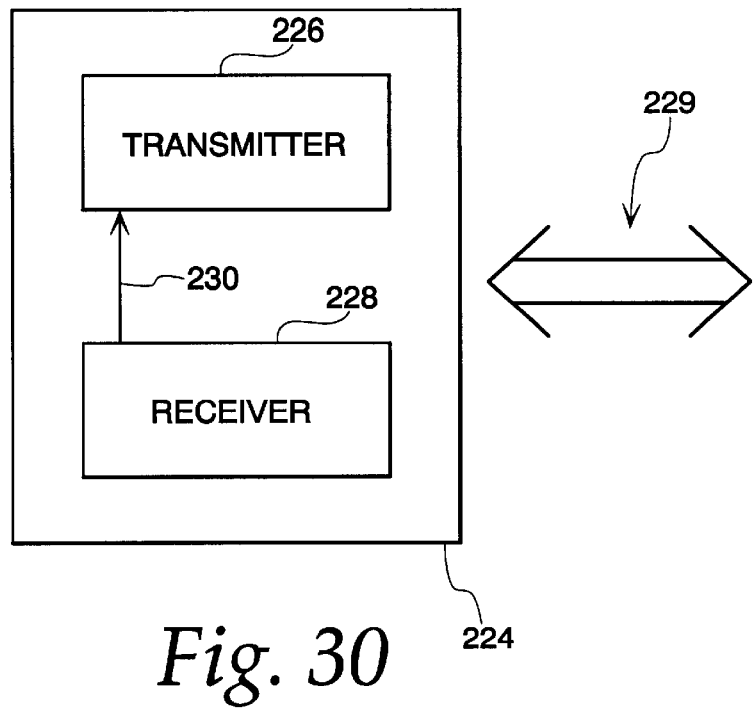
FIG. 30 is a block diagram of a radiotelephone for use with the enhanced half-rate modulation scheme of the present invention.

As shown in FIG. 30, a radiotelephone 224 includes both a transmitter 226 and a receiver 228. The receiver 228 measures the quality of received signals 229, and from this measurement determines whether its transmitter 226 should use conventional full-rate or half-rate encoding or expanded half-rate encoding, via signal 230. This assumes that the RF channel provides symmetric performance. When the receiver 228 senses that extensive transmission errors are occurring, the transmitter 226 is configured to use expanded half-rate encoding. The expanded half-rate encoding may be accomplished via any of the methods previously described.

As an example, if extensive errors are occurring, a decision may be made by the receiver 228 to shift from conventional encoding (either full-rate or half-rate) to expanded half-rate encoding. The receiver 228, in addition to instructing the transmitter 226 to transmit in expanded half-rate mode, via signal 230, also shifts from conventional decoding (either full-rate or half-rate) to expanded half-rate decoding. Once in expanded half-rate mode, a decision may be made by the receiver 228 to shift back to conventional encoding (either full-rate or half-rate) if the error rate drops. In this manner, the near-end member of a near-end-to-far-end conversation makes its own determination concerning the toggle of the near-end member from one mode to the other based on the assumption of the symmetric performance.

Figure 31:
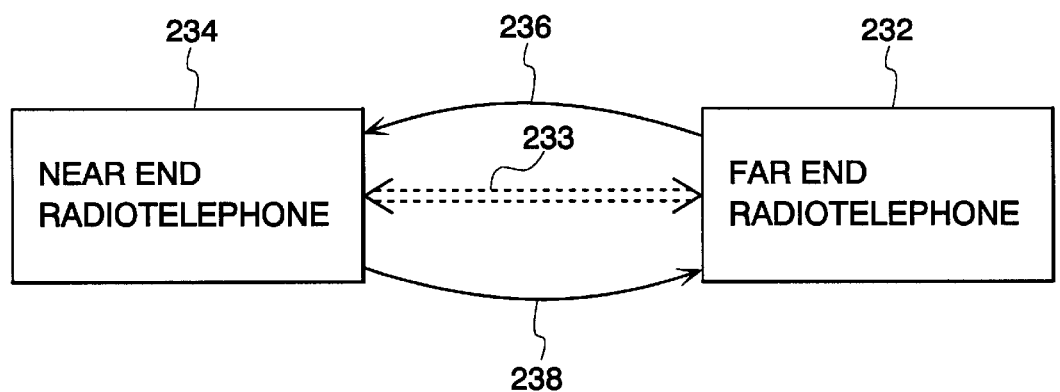
FIG. 31 is a block diagram illustrating the toggling of near end and far end radiotelephones of a conversation pair between prior art encoding (full-rate or half-rate) and enhanced half-rate encoding.

Alternatively, as shown in FIG. 31, the far-end member 232 (radiotelephone) of a conversation pair can detect deteriorating channel conditions on signal 233, and request or instruct the near-end member 234 (radiotelephone) to toggle, via signal 236, thereby mooting any questions of symmetry.

In any case, the second radiotelephone 232 at the far end of a conversation pair must somehow be aware that the near-end radiotelephone 234 has toggled. The far-end radiotelephone 232 may be implicitly notified of the toggle. For example, the far-end radiotelephone 232 may decode the incoming data as if conventional full-rate transmission has been utilized, and if errors are detected, toggle to enhanced half-rate mode. As an alternative, the far-end radiotelephone 232 could decode all incoming data according to both expanded half-rate and conventional full-rate decoding and select the most likely result of the two output streams, thereby deducing the mode of the near-end radiotelephone 234. As another alternative, the near-end radiotelephone 234 can explicitly inform the far-end radiotelephone 232 that the near-end radiotelephone 234 has toggled over a signalling channel 238, such as, but not limited to, the SACCH or FACCH (Fast Associated Control Channel) of a cellular system.

Notification to toggle can also be carried from the far end radiotelephone 232 to the near end radiotelephone 234 by retransmission requests in an ARQ (Automatic Request for Retransmission) system. Alternatively, the far-end radiotelephone 232 can request or command the near-end radiotelephone 234 to toggle over a signalling channel such as the SACCH or FACCH of a cellular system.

While the present invention has been described with particular reference to the drawings, it should be understood that various modifications could be made without departing from the spirit and scope of the present invention.

What is claimed is:

1. A method of transmitting a digitized signal across a radio channel, comprising:

encoding a digitized signal comprising a binary bit stream having bits classified as one of critical, important and unimportant, at a first rate;

expanding the encoded digitized signal to a second rate greater than the first rate and according to bit classification by deriving parity bits from the critical bits;

encoding the parity bits with a $\frac{1}{6}$ rate convolutional encoder to produce a first output signal;

combining the critical and important bits and adding six tail bits to produce a second output signal;

encoding the second output signal with a $\frac{1}{4}$ rate convolutional encoder to produce a third output signal;

encoding the unimportant bits with a $\frac{1}{2}$ rate convolutional encoder to produce a fourth output signal;

encoding the first, third and fourth output signals to produce the expanded digitized signal at the second rate; and transmitting the expanded digitized signal at the second rate across a radio channel.

2. A method of establishing voice communication across a radio channel in a wireless communication system, comprising:

transmitting a digitized speech signal at a full-rate across a radio channel, said digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream;

receiving the transmitted digitized speech signal at a receiver;

demodulating the received digitized speech signal at a full-rate equalizer, the full-rate equalizer producing dibits of soft information in response thereto, each soft dibit including soft values;

multiplying the soft values of the soft dibit together at a multiplier, said multiplier outputting a positive value if the soft values of the soft dibit are the same and a negative value if the soft values of the soft dibit are different;

summing the output of the multiplier; and activating a half-rate equalizer to demodulate the received digitized speech signal if the summed output of the multiplier exceeds a threshold value.

3. A method of establishing voice communication across a radio channel in a wireless communication system, comprising:

transmitting a digitized speech signal at a full-rate across a radio channel, said digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream;

receiving the transmitted digitized speech signal at a receiver;

demodulating the received digitized speech signal at a full-rate equalizer, the full-rate equalizer producing dibits of soft information in response thereto, said soft dibits plottable on a differential constellation having real and imaginary axes, each plotted soft dibit representing a complex value of a differential symbol;

rotating the differential symbols by $\pi/4$, said rotated differential symbols having components on the real and imaginary axes;

summing magnitudes of the rotated differential symbol components on the real and imaginary axes;

calculating a ratio of real axis summed magnitudes versus imaginary axis summed magnitudes; and activating a half-rate equalizer to demodulate the received digitized speech signal if the ratio exceeds a threshold value.

4. A method of establishing voice communication across a radio channel in a wireless communication system, comprising:

transmitting a digitized speech signal at a full-rate across a radio channel, said digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream;

receiving the transmitted digitized speech signal at a receiver;

demodulating the received digitized speech signal at a full-rate equalizer, the full-rate equalizer producing dibits of soft information in response thereto, each soft dibit representing a different symbol;

determining phase differences between successive differential symbols;

summing the determined phase differences; and activating a half-rate equalizer to demodulate the received digitized speech signal if the summed phase difference exceeds a threshold value.

5. A method of establishing voice communication across a radio channel in a wireless communication system, comprising:

transmitting a digitized speech signal at a full-rate across a radio channel, said digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream;

receiving the transmitted digitized speech signal at a receiver;

demodulating the received digitized speech signal at a full-rate equalizer, the full-rate equalizer producing dibits of soft information in response thereto, said soft dibits plottable on a differential constellation having real and imaginary axes, each plotted soft dibit representing a complex value of a differential symbol;

rotating the differential symbols by $\pi/4$, said rotated differential symbols having components on the real and imaginary axes;

squaring the complex values of the rotated differential symbols;

summing the squared values; and activating a half-rate equalizer to demodulate the received digitized speech signal if the real component of the squared/summed value exceeds a threshold value.

6. A method of receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

receiving the digitized speech signal at a receiver;

demodulating the received digitized speech signal at a full-rate equalizer the full-rate equalizer producing dibits of soft information in response thereto, each soft dibit including soft values;

multiplying the soft values of the soft dibit together at a multiplier, said multiplier outputting a positive value if the soft values of the soft dibit are the same and a negative value if the soft values of the soft dibit are different;

summing the output of the multiplier; and activating a half-rate equalizer to demodulate the received digitized speech signal if the summed output of the multiplier exceeds a threshold value.

7. A method of receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

receiving the digitized speech signal at a receiver;

demodulating the received digitized speech signal at a full-rate equalizer the full-rate equalizer producing dibits of soft information in response thereto, said soft dibits plottable on a differential constellation having real and imaginary axes, each plotted soft dibit representing a complex value of a differential symbol;

rotating the differential symbols by $\pi/4$, said rotated differential symbols having components on the real and imaginary axes;

summing magnitudes of the rotated differential symbol components on the real and imaginary axes;

calculating a ratio of real axis summed magnitudes versus imaginary axis summed magnitudes; and activating a half-rate equalizer to demodulate the received digitized speech signal if the ratio exceeds a threshold value.

8. A method of receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

receiving the digitized speech signal at a receiver;

demodulating the received digitized speech signal at a full-rate equalizer, the full-rate equalizer producing dibits of soft information in response thereto, each soft dibit representing a differential symbol;

determining phase differences between successive differential symbols;

summing the determined phase differences; and activating a half-rate equalizer to demodulate the received digitized speech signal if the summed phase difference exceeds a threshold value.

9. An improved receiver for receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

a full-rate equalizer;

a half-rate equalizer;

a switch initially routing the received digitized speech signal to the full-rate equalizer, wherein said full-rate equalizer demodulates the received digitized speech signal producing a full-rate demodulated signal and dibits of soft information corresponding to the full-rate demodulated signal, each soft dibit including soft values;

an analyzer analyzing the dibits of information, said analyzer comprising a multiplier multiplying the soft values of the soft dibits together, said multiplier outputting a positive value if the soft values of the soft dibit are of like polarity and negative value if the soft values of the soft dibit are of different polarity;

a summer receiving and summing the output of the multiplier; and a threshold detector connected to the summer, said threshold detector controlling the switch to route the received digitized speech signal to the half-rate equalizer if the summed value exceeds a positive threshold value.

10. An improved receiver for receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

a full-rate equalizer;

a half-rate equalizer;

a switch initially routing the received digitized speech signal to the full-rate equalizer, wherein said full-rate equalizer demodulates the received digitized speech signal producing a full-rate demodulated signal and dibits of soft information plottable on a differential constellation having real and imaginary axes, each plotted dibit representing a complex value of a differential symbol corresponding to the full-rate demodulated signal;

an analyzer analyzing the dibits of information, said analyzer comprising a rotator rotating the differential symbols by $\pi/4$, said rotated differential symbols having components on the real and imaginary axes;

a summer summing magnitudes of the rotated differential symbol components on the real and imaginary axes and calculating a ratio of real axis summed magnitudes versus imaginary axis summed magnitudes; and a threshold detector connector to the summer, said threshold detector controlling the switch to route the received digitized speech signal to the half-rate equalizer if the calculated ratio exceeds a threshold value.

11. An improved receiver for receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

a full-rate equalizer;

a half-rate equalizer;

a switch initially routing the received digitized speech signal to the full-rate equalizer, wherein said full-rate equalizer demodulates the received digitized speech signal producing a full-rate demodulated signal and dibits of soft information plottable on a differential constellation having real and imaginary axes, each plotted dibit representing a complex value of a differential symbol corresponding to the full-rate demodulated signal;

an analyzer analyzing the dibits of information, said analyzer comprising a rotator rotating the differential symbols by $\pi/4$, said rotated differential symbols having components on the real and imaginary axes;

a squarer and summer squaring the complex values of the rotated differential symbols and summing the squared values; and a threshold detector connector to the squarer and summer, the threshold detector controlling the switch to route the received digitized speech signal to the half-rate equalizer if the real component of the squared/summed value exceeds a threshold value.

12. An improved receiver for receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

a full-rate equalizer;

a half-rate equalizer;

a switch initially routing the received digitized speech signal to the full-rate equalizer, wherein said full-rate equalizer demodulates the received digitized speech signal producing a full-rate demodulated signal and dibits of soft information having a real number magnitude and a real number phase plottable on a differential constellation, each plotted dibit representing a differential symbol;

an analyzer analyzing the dibits of information, said analyzer comprising a phase differentiator determining phase changes between successive differential symbols;

a summer summing the phase changes determined by the phase differentiator; and a threshold detector connector to the summer, said threshold detector controlling the switch to route the received digitized speech signal to the half-rate equalizer if the summed phase changes exceed a threshold value.

13. A method of establishing voice communication across a radio channel in a wireless communication system, comprising:

transmitting a digitized speech signal at a full-rate across a radio channel said digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream;

receiving the transmitted digitized speech signal at a receiver;

demodulating the received digitized speech signal with a full-rate equalizer, the full-rate equalizer producing dibits of information in response thereto, inputting the dibits of information to an XNOR gate, said XNOR gate outputting a logical one if the bits of the dibit are the same and a logical zero if the bits of the dibit are different;

counting the number of occurrences of logical ones at the output of the XNOR gate; and activating a half-rate equalizer to demodulate the received digitized speech signal if the number of logical ones exceeds a threshold value.

14. A method of receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

receiving the transmitted digitized speech signal at a receiver;

demodulating the received digitized speech signal at a full-rate equalizer, the full-rate equalizer producing dibits of information in response thereto;

inputting the dibits of information to an XNOR gate, said XNOR gate outputting a logical one if the bits of the dibit are the same and a logical zero if the bits of the dibit are different;

counting the number of occurrences of logical ones at the output of the XNOR gate; and activating a half-rate equalizer to demodulate the received digitized speech signal if the number of logical ones exceeds a threshold value.

15. An improved receiver for receiving a digitized speech signal transmitted at a full-rate across a radio channel in a wireless communication system, the digitized speech signal selected from the group consisting of (a) a full-rate encoded digitized speech signal comprising a stream of binary bits, and (b) a half-rate encoded digitized speech signal comprising a stream of binary bits expanded for transmission at the full-rate by repeating each bit in the binary bit stream, comprising:

a full-rate equalizer;

a half-rate equalizer;

a switch initially routing the received digitized speech signal to the full-rate equalizer, wherein said full-rate equalizer demodulates the received digitized speech signal producing a full-rate demodulated signal and dibits of information corresponding to the full-rate demodulated signal and dibits of information corresponding to the full-rate demodulated signal;

an XNOR gate receiving the dibits of information, said XNOR gate outputting a logical one if the bits of the dibit are the same and a logical zero if the bits of the dibit are different;

a counter receiving the output of the XNOR gate, said counter counting the occurrences of logical ones at the output of the XNOR gate; and a threshold detector connected to the counter, said threshold detector controlling the switch to route the received digitized speech signal to the half-rate equalizer if the number of logical ones counted by the counter exceeds a threshold value.

* * * * *